(12) United States Patent
Tanaka

(10) Patent No.: US 10,138,784 B2
(45) Date of Patent: Nov. 27, 2018

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventor: Takayoshi Tanaka, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 97 days.

(21) Appl. No.: 15/187,944

(22) Filed: Jun. 21, 2016

(65) Prior Publication Data
US 2017/0051694 A1 Feb. 23, 2017

(30) Foreign Application Priority Data

Aug. 18, 2015 (JP) .................. 2015-161001

(51) Int. Cl.
| | | |
|---|---|---|
| F01N 3/10 | (2006.01) | |
| F01N 3/20 | (2006.01) | |
| F02D 41/02 | (2006.01) | |
| F02D 41/00 | (2006.01) | |
| F01N 3/08 | (2006.01) | |
| F01M 13/00 | (2006.01) | |

(52) U.S. Cl.
CPC .......... F01N 3/2066 (2013.01); F01M 13/00 (2013.01); F01N 3/0814 (2013.01); F01N 3/0842 (2013.01); F01N 3/101 (2013.01); F02D 41/0007 (2013.01); F02D 41/027 (2013.01); F02D 2200/0806 (2013.01); F02D 2250/08 (2013.01); F02D 2250/41 (2013.01); Y02T 10/144 (2013.01); Y02T 10/22 (2013.01)

(58) Field of Classification Search
CPC ..... F01M 13/00; F01N 3/0814; F01N 3/0842; F01N 3/101; F01N 3/2066; F02D 41/0007; F02D 41/027; F02D 2200/0806; F02D 2250/08; F02D 2250/41; Y02T 10/144; Y02T 10/22
See application file for complete search history.

(56) References Cited

U.S. PATENT DOCUMENTS

| | | | | |
|---|---|---|---|---|
| 6,148,612 | A * | 11/2000 | Yamashita | ............ F01N 3/0842 60/274 |
| 2005/0155562 | A1* | 7/2005 | Taxon | .................... F01M 13/00 123/41.86 |
| 2011/0183812 | A1* | 7/2011 | Cunningham | .......... B60T 13/72 477/183 |

FOREIGN PATENT DOCUMENTS

| | | |
|---|---|---|
| JP | H06-108903 A | 4/1994 |
| JP | 2013-050096 A | 3/2013 |

(Continued)

*Primary Examiner* — Brandon Lee
(74) *Attorney, Agent, or Firm* — Hunton Andrews Kurth LLP

(57) ABSTRACT

A PCV valve that ventilates a crankcase is provided. A three-way catalyst and a NOx storage/reduction catalyst are provided in an exhaust passage. An electronic control unit performs a stoichiometric control and a lean control. When a crankcase ventilation request is issued, a relationship between a ventilation amount of ventilation achieved by the PCV valve and a fuel consumption resulting from the ventilation is calculated. Furthermore, an operational condition under which the ventilation amount meets a required ventilation amount and the fuel consumption is minimized is calculated. The operational condition is calculated so that a constant engine torque is maintained and the air-fuel ratio falls within a range that ensures purification.

14 Claims, 18 Drawing Sheets

(56) References Cited

FOREIGN PATENT DOCUMENTS

| JP | 2013-096247 A | 5/2013 |
|---|---|---|
| JP | 2013-124544 A | 6/2013 |

\* cited by examiner

CONTROLLER FOR INTERNAL COMBUSTION ENGINE

CROSS-REFERENCE TO RELATED APPLICATION

The present application claims priority to Japanese Patent Application No. 2015-161001 filed on Aug. 18, 2015, which is incorporated herein by reference in its entirety.

BACKGROUND OF THE INVENTION

Field of the Invention

Embodiments of the present invention relate to a controller for an internal combustion engine. More particularly, embodiments of the present invention relate to a controller for an internal combustion engine suitable as an onboard controller for an internal combustion engine that performs a lean burn operation.

Background Art

Japanese Patent Laid-Open No. 2013-124544 (hereafter, referred to as Patent Document 1) discloses an internal combustion engine provided with a positive crankcase ventilation (PCV) valve and an ejector. A blow-by gas containing NOx and CO2 can flow through the crankcase of an internal combustion engine. Thus, an internal combustion engine requires appropriate ventilation of gas in the crankcase (referred to as an "in-case gas", hereinafter).

The PCV valve is disposed between the crankcase and the intake passage so as to suck the in-case gas into the intake passage by using the negative pressure of the intake air. The PCV valve can appropriately ventilate the interior of the crankcase under a situation where an appropriate negative pressure of the intake air occurs.

The ejector is mounted on the internal combustion engine along with a supercharger. In the internal combustion engine provided with a supercharger, a pressure difference occurs between before and after the compressor. The ejector has an inlet that is in communication with the interior of the crankcase, an outlet that is in communication with a part upstream of the compressor and a pressure introduction port that is in communication with a part downstream of the compressor. With such a configuration, when a pressure difference occurs between before and after the compressor, an air flow from the pressure introduction port to the outlet occurs in the ejector. Once such an air flow occurs, the ejector ejects the in-case gas sucked in through the inlet through the outlet. Thus, the ejector can appropriately ventilate the interior of the crankcase under a situation where an appropriate supercharging pressure occurs.

LIST OF RELATED ART

Following is a list of patent documents which the applicant has noticed as related arts of the present invention.
[Patent Document 1]
 Japanese Patent Laid-Open No. 2013-124544
[Patent Document 2]
 Japanese Patent Laid-Open No. 2013-096247
[Patent Document 3]
 Japanese Patent Laid-Open No. 1994-108903
[Patent Document 4]
 Japanese Patent Laid-Open No. 2013-050096

PROBLEM TO BE SOLVED BY EMBODIMENTS OF THE INVENTION

However, the internal combustion engine described in Patent Document 1 can continue running under a condition where the negative pressure of the intake air hardly occurs, and the supercharging pressure is insufficient. If the negative pressure of the intake air does not occur, the PCV valve cannot ventilate the in-case gas. If the supercharging pressure is insufficient, the ejector does not ventilate the in-case gas. Under such an operational condition, the internal combustion engine described in the Patent Document 1 may be unable to satisfactorily ventilate the crankcase.

Embodiments of the present invention has been devised to solve the problems described above. An object of the embodiments of the present invention is to provide a controller for an internal combustion engine that can increase the in-case gas ventilation capability by changing the operational state without deteriorating the power characteristics and exhaust characteristics of the internal combustion engine as required.

SUMMARY

To achieve the above mentioned purpose, a first aspect of an embodiment of the present invention is a controller for an internal combustion engine. The controller, comprises: a PCV valve that ventilates a crankcase by causing suction of an in-case gas into an intake passage; a three-way catalyst and an NOx storage/reduction catalyst disposed in an exhaust passage; and an electronic control unit that drives an actuator involved with the internal combustion engine. The electronic control unit performs a stoichiometric control for making the internal combustion engine run in a stoichiometric region including a theoretical air-fuel ratio and a lean control for making the internal combustion engine run in a lean region that is leaner than the stoichiometric region. When a ventilation request for the crankcase is issued, the electronic control unit extracts, as a ventilation condition, a combination of an air-fuel ratio of an air-fuel mixture, a fuel injection amount and an intake manifold pressure with which a ventilation amount of the in-case gas per unit time increases among combinations of those, and changes the air-fuel ratio, the fuel injection amount and the intake manifold pressure in accordance with the ventilation condition. The extraction concerning the air-fuel ratio is performed within an allowable air-fuel ratio range in which the three-way catalyst and the NOx storage/reduction catalyst are capable of purifying an exhaust gas and ensuring in-cylinder combustion of the air-fuel mixture. The air-fuel ratio and the fuel injection amount extracted as the ventilation condition meets a relationship that maintains a constant engine torque before and after the change.

A second aspect of an embodiment of the present invention is the controller for an internal combustion engine according to the first aspect discussed above. In this aspect, the electronic control unit sets a required ventilation amount of the in-case gas per unit time when the ventilation request is issued. Further, the ventilation condition is extracted so that the ventilation amount meets the required ventilation amount.

A third aspect of an embodiment of the present invention is the controller for an internal combustion engine according to the second aspect discussed above. In this aspect, the ventilation condition is a combination that meets the required ventilation amount with a minimum fuel consumption, among combinations of the air-fuel ratio within the allowable air-fuel ratio range, the fuel injection amount that maintains the constant engine torque and the intake manifold pressure.

A fourth aspect of an embodiment of the present invention is the controller for an internal combustion engine according to the third aspect discussed above. In this aspect, when the ventilation request is issued, the electronic control unit (1-1) temporarily determines the air-fuel ratio within the allowable air-fuel ratio range, (1-2) performs a determination processing for determining the intake manifold pressure that meets the required ventilation amount with the minimum fuel consumption for a combination of the temporarily determined air-fuel ratio and the fuel injection amount that maintains the constant engine torque at the air-fuel ratio, (2) repeatedly performs the determination processing for each of a plurality of air-fuel ratios included in the allowable air-fuel ratio range, and (3) extracts, as the ventilation condition, a combination of an intake manifold pressure that provides the minimum fuel consumption among all intake manifold pressures determined in the determination processing and the air-fuel ratio and fuel injection amount used in the determination processing of determining the intake manifold pressure.

A fifth aspect of an embodiment of the present invention is the controller for an internal combustion engine according to the first aspect discussed above. The controller further comprising: a throttle valve that controls an intake air amount; a supercharger provided with a waste gate valve; and an ejector that ventilates the crankcase by using a pressure difference between before and after a compressor of the supercharger. The ventilation condition is a combination with which a total ventilation amount per unit time achieved by both the PCV valve and the ejector increases, among combinations of the air-fuel ratio of the air-fuel mixture, the fuel injection amount, the intake manifold pressure, a throttle opening and a waste gate opening angle.

A sixth aspect of and embodiment of the present invention is the controller for an internal combustion engine according to the fifth aspect discussed above. In this aspect, the electronic control unit sets a required ventilation amount of the in-case gas per unit time when the ventilation request is issued. The ventilation condition is extracted so that the total ventilation amount meets the required ventilation amount.

A seventh aspect of an embodiment of the present invention is the controller for an internal combustion engine according to the sixth aspect discussed above. In this aspect, the ventilation condition is a combination that meets the required ventilation amount with a minimum fuel consumption, among combinations of the air-fuel ratio within the allowable air-fuel ratio range, the fuel injection amount that maintains the constant engine torque, the intake manifold pressure, the throttle opening and the waste gate opening angle.

An eighth aspect of an embodiment of the present invention is the controller for an internal combustion engine according to the seventh aspect discussed above. In this aspect, when the ventilation request is issued, the electronic control unit (1-1) temporarily determines the air-fuel ratio within the allowable air-fuel ratio range, (1-2) temporarily determines the intake manifold pressure within a practical range, (1-3) performs a determination processing for determining a pair of the throttle opening and the waste gate opening angle that meets the required ventilation amount with the minimum fuel consumption for the combination of the temporarily determined intake manifold pressure and air-fuel ratio and the fuel injection amount that allows generation of the constant torque at the air-fuel ratio, (2) repeatedly performs the determination processing for each of a plurality of combinations of a plurality of air-fuel ratios included in the allowable air-fuel ratio range and a plurality of intake manifold pressures included in the practical range, and (3) extracts, as the ventilation condition, a combination of a pair of a throttle opening and a waste gate opening angle that provides the minimum fuel consumption, among all pairs of a throttle opening and a waste gate opening angle determined by the determination processing, and the air-fuel ratio, fuel injection amount and intake manifold pressure used in the determination processing of determining the pair.

A ninth aspect of an embodiment of the present invention is the controller for an internal combustion engine according to any one of the second to fourth aspects and the sixth to eighth aspects discussed above. In this aspect, the electronic control unit detects an NOx concentration in the crankcase before setting the required ventilation amount based on the NOx concentration.

A tenth aspect of an embodiment of the present invention is the controller for an internal combustion engine according to any one of the second to fourth aspects and the sixth to eighth aspects discussed above. In this aspect, the electronic control unit detects a $CO_2$ concentration in the crankcase before setting the required ventilation amount based on the $CO_2$ concentration.

An eleventh aspect of and embodiment of the present invention is the controller for an internal combustion engine according to any one of the first to tenth aspect discussed above. In this aspect, the electronic control unit detects an NOx concentration in the crankcase, and recognizes issue of the ventilation request when the NOx concentration reaches a threshold.

A twelfth aspect of an embodiment of the present invention is the controller for an internal combustion engine according to any one of the first to eleventh aspect discussed above. In this aspect, the electronic control unit detects a $CO_2$ concentration in the crankcase, and recognizes issue of the ventilation request when the $CO_2$ concentration reaches a threshold.

A thirteenth aspect of and embodiment of the present invention is the controller for an internal combustion engine according to any one of the first to twelfth aspect discussed above. In this aspect, the allowable air-fuel ratio range consists of said stoichiometric region and said lean region. Between said stoichiometric region and said lean region, there is an intermediate region in which NOx in the exhaust gas is not purified by the three-way catalyst and the NOx storage/reduction catalyst. When the electronic control unit changes the air-fuel ratio in response to the ventilation request being issued, if the air-fuel ratio changes across the intermediate region, the electronic control unit performs the change after performing a rich control to make the air-fuel ratio of the air-fuel mixture richer than the theoretical air-fuel ratio until the NOx storage/reduction catalyst restores a NOx storage capacity.

ADVANTAGES OF EMBODIMENTS OF THE PRESENT INVENTION

According to the first aspect discussed above, the internal combustion engine can run in the stoichiometric region and the lean region. Therefore, according to this aspect, when a crankcase ventilation request is issued, the air-fuel ratio of the air-fuel mixture can be changed within the range including the stoichiometric region and the lean region. By changing the air-fuel ratio, the air amount can be changed without changing the torque of the internal combustion engine. If the air amount changes, the intake manifold pressure also changes. If the intake manifold pressure changes, the amount of gas sucked in by the PCV valve changes, and as a result, the in-case gas ventilation amount changes. When the ventilation request is issued, the electronic control unit changes the air-fuel ratio, the fuel injection amount and the intake manifold pressure so as to increase the ventilation amount. Thus, according to this aspect, the in-case gas ventilation amount can be increased when ventilation is required. To this end, the electronic control unit uses an air-fuel ratio that lies in the allowable air-fuel ratio range and a fuel injection amount that maintains a constant engine torque. Consequently, the power characteristics and the exhaust characteristics of the internal combustion engine are not deteriorated.

According to the second aspect discussed above, when the ventilation request is issued, a required ventilation amount per unit time is set. The ventilation condition is extracted so as to provide a ventilation amount that meets the required ventilation amount. Thus, according to this aspect, when the ventilation request is issued, a ventilation amount that meets the required ventilation amount can be provided without deteriorating the power characteristics and the exhaust characteristics of the internal combustion engine.

According to the third aspect discussed above, a ventilation condition that meets the required ventilation amount with the minimum fuel consumption can be extracted. Thus, according to this aspect, when the ventilation request is issued, a desired ventilation amount can be ensured without deteriorating the power characteristics and the exhaust characteristics of the internal combustion engine and without deteriorating the fuel consumption characteristics.

According to the fourth aspect discussed above, a ventilation condition that meets the required ventilation amount with the minimum fuel consumption can be extracted with reliability by performing the processings (1-1) to (3).

According to the fifth aspect discussed above, the amount of ventilation by the PCV valve can be increased by increasing the negative pressure of the intake air. In addition, the amount of ventilation by the ejector can be increased by increasing the supercharging pressure. According to this aspect, when the ventilation request is issued, a ventilation condition that increases the total ventilation amount, which is the sum of the amounts of ventilation by the PCV valve and the ejector, is extracted. The total ventilation amount can be increased by increasing the supercharging pressure under a circumstance where the negative pressure of the intake air can hardly be increased, and can be increased by ensuring the negative pressure of the intake air under a circumstance where the supercharging pressure can hardly be ensured. Thus, according to this aspect, compared with the case where only the PCV valve is used, a ventilation condition that provides a desired ventilation amount can be more easily extracted.

According to the sixth aspect discussed above, a condition for the internal combustion engine provided with the PCV valve and the ejector to meet the required ventilation amount is extracted as the ventilation condition. Thus, according to this aspect, when the ventilation request is issued, the PCV valve and the ejector can provide the total ventilation amount that meets the required ventilation amount.

According to the seventh aspect discussed above, a condition for the internal combustion engine provided with the PCV valve and the ejector to provide the required ventilation amount with the minimum fuel consumption is extracted as the ventilation condition. Thus, according to this aspect, the total ventilation amount that meets the required ventilation amount can be provided without deteriorating the fuel consumption characteristics of the internal combustion engine.

According to the eighth aspect discussed above, a ventilation condition for the internal combustion engine provided with the PCV valve and the ejector to provide the minimum fuel consumption and meet the required ventilation amount can be extracted with reliability by performing the processings (1-1) to (3).

According to the ninth aspect discussed above, a required ventilation amount that is neither too much nor too little can be set based on the NOx concentration in the crankcase.

According to the tenth aspect discussed above, a required ventilation amount that is neither too much nor too little can be set based on the $CO_2$ concentration in the crankcase.

According to the eleventh aspect discussed above, the electronic control unit can efficiently recognize issue of the ventilation request when the NOx concentration in the crankcase has become high.

According to the twelfth aspect discussed above, the electronic control unit can efficiently recognize issue of the ventilation request when the $CO_2$ concentration in the crankcase has become high.

According to the thirteenth aspect discussed above, when the air-fuel ratio changes across the intermediate region, the NOx storage capacity of the NOx storage/reduction catalyst can be restored before the change. When the air-fuel ratio changes across the intermediate region, a large amount of NOx is emitted. In this process, since the NOx storage capacity is already restored, NOx emission into the atmosphere can be effectively prevented.

DETAILED DESCRIPTION

First Embodiment
[Configuration of First Embodiment]

Figure 1:
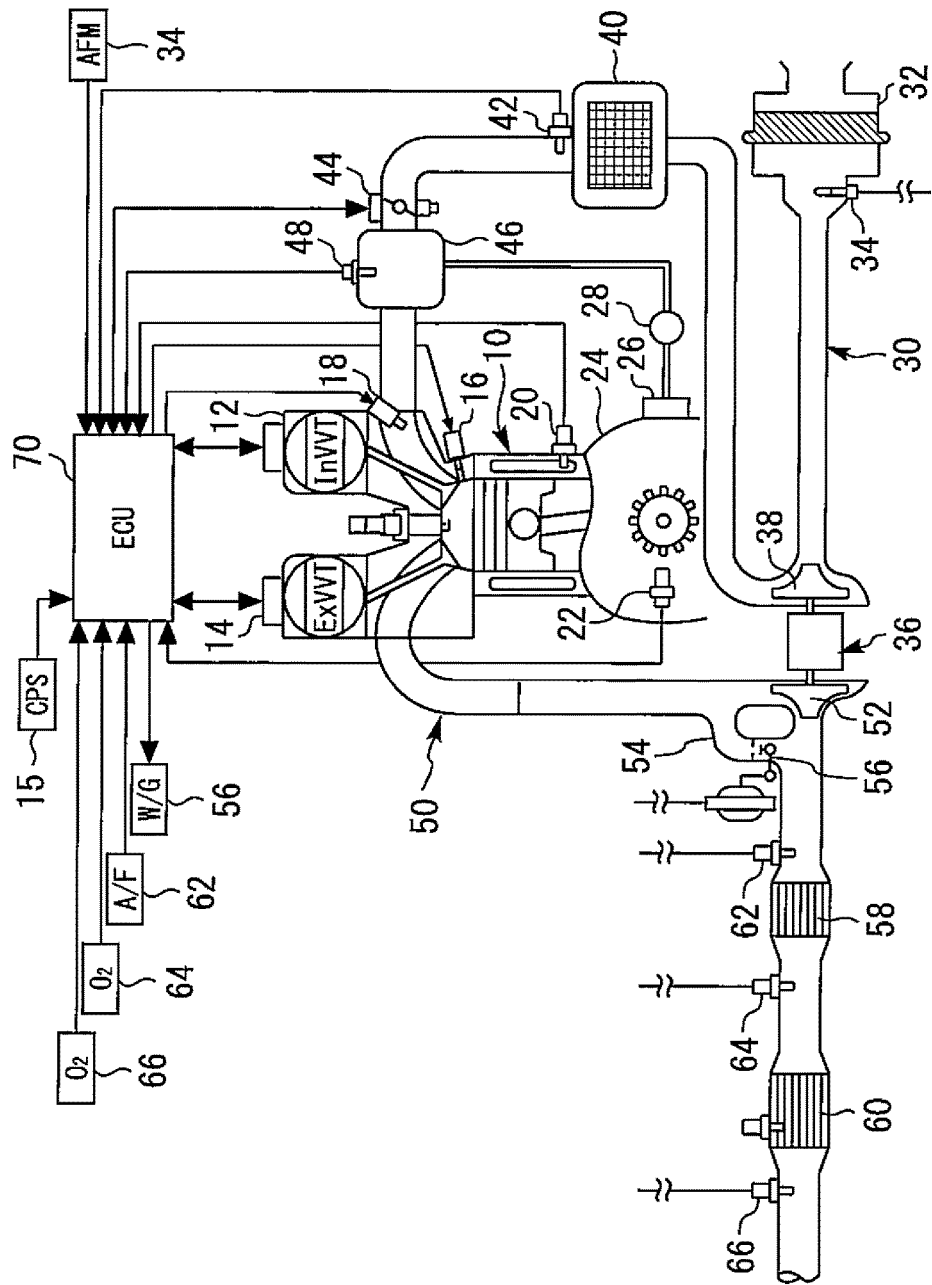
FIG. 1 is a diagram for explaining the configuration of a first embodiment of the present invention.

FIG. 1 shows a configuration of a first embodiment of the present invention. This embodiment includes an internal combustion engine 10. The internal combustion engine 10 includes variable valve timing mechanisms 12 and 14 on an intake side and an exhaust side. The variable valve timing mechanisms 12 and 14 can change opening characteristics of an intake valve and an exhaust valve. The state of the variable valve timing mechanism 12 on the intake side is synonymous with the opening characteristics of the intake valve. Thus, both of them are equally referred to as "intake valve characteristics InVVT" in the following description.

The internal combustion engine 10 includes a combustion pressure sensor 15 (see CPS 15 at the top of FIG. 1), an in-cylinder injection valve 16 and a port injection valve 18. They are provided for each air cylinder. The internal combustion engine 10 further includes a water temperature sensor 20 and a crank angle sensor 22. The crank angle sensor 22 enables detection of the engine speed NE of the internal combustion engine 10.

An oil separator 26 is attached to a crankcase 24 of the internal combustion engine 10. A positive crankcase ventilation (PCV) valve 28 is connected to the oil separator 26. The interior space of the crankcase 24 is in communication with the PCV valve 28 through the oil separator 26. A blow-by gas containing oil or the like flows into the crankcase 24 from a combustion chamber of the internal combustion engine 10. The oil separator 26 can remove the oil and feed an in-case gas without oil to the PCV valve 28.

The internal combustion engine 10 is in communication with an intake passage 30. The intake passage 30 is provided with an air flowmeter (AFM) 34 downstream of an air filter 32. A compressor 38 of a turbocharger 36 is disposed downstream of the AFM 34. An intercooler 40 is disposed downstream of the compressor 38, a supercharging pressure sensor 42 is disposed downstream of the intercooler 40, and an electronic throttle valve 44 is disposed downstream of the supercharging pressure sensor 42. In the following, the pressure detected by the supercharging pressure sensor 42 or, in other words, the pressure on the upstream side of the throttle valve 44 will be referred to as a "supercharging pressure Psc".

The throttle valve 44 is in communication with a surge tank 46 on the downstream side thereof. The internal pressure of the surge tank 46 becomes negative pressure as the throttle valve 44 is closed. The PCV valve 28 described above is in communication with the surge tank 46, and the negative pressure causes the in-case gas to flow into the surge tank 46. The in-case gas circulates in this way, and the internal combustion engine 10 can ventilate the crankcase 24.

As shown in FIG. 1, the surge tank 46 is provided with an intake air pressure sensor 48. The intake air pressure sensor 48 enables measurement of the internal pressure of the surge tank 46. In this embodiment, in the following, the internal pressure will be referred to as an "intake manifold pressure Pin".

The internal combustion engine 10 is in communication with an exhaust passage 50. The exhaust passage 50 incorporates a turbine 52 of the turbocharger 36. The exhaust passage 50 is provided with a bypass channel 54 that bypasses the turbine 52. The bypass channel 54 is provided with a waste gate valve (WGV) 56. The turbocharger 36 can change the ratio of the exhaust gas used for driving of the turbine 52 by changing the opening of the WGV 56.

The exhaust passage 50 is provided with a three-way catalyst 58 and a NOx storage/reduction catalyst (NSR catalyst) 60 downstream of the turbine 52. An air-fuel ratio sensor 62 is disposed upstream of the three-way catalyst 58. The air-fuel ratio sensor 62 generates a signal that is linear with respect to the air-fuel ratio of the gas flowing around the air-fuel ratio sensor 62.

Oxygen sensors 64 and 66 are disposed downstream of the three-way catalyst 58 and the NSR catalyst 60, respectively. The oxygen sensors 64 and 66 changes an output signal stepwise according to whether the air-fuel ratio of the gas flowing around the oxygen sensors is lean or rich compared with a theoretical air-fuel ratio.

The system shown in FIG. 1 includes an electronic control unit (abbreviated as ECU, hereinafter) 70. The various sensors and actuators described above involved in the internal combustion engine 10 are connected to the ECU 70. The ECU 70 can detect the state of the internal combustion engine 10 based on the outputs from the sensors and control the state of the internal combustion engine 10 by driving the actuators.

[Basic Operation of First Embodiment]
(Stoichiometric Control and Lean Control)

According to this embodiment, the ECU 70 can switch between a stoichiometric control and a lean control. The "stoichiometric control" is a control to make the internal combustion engine 10 run with the air-fuel ratio of the air-fuel mixture controlled to be a value within a stoichiometric region including a theoretical air-fuel ratio. The stoichiometric control is suitable for the internal combustion engine 10 to operate with high power and responsivity and is mainly used in a high load and high rotation region.

The "lean control" described above is a control to make the internal combustion engine 10 run with the air-fuel ratio of the air-fuel mixture controlled to be a value within a lean region, which is leaner than the stoichiometric region. The lean control is suitable for achieving high fuel economy and is mainly used in a low load and low rotation region. According to this embodiment, the stoichiometric control and the lean control are performed as described above. Thus, the internal combustion engine 10 requires a wide air-fuel ratio range.

(Allowable Air-Fuel Ratio Range)

The exhaust system of the internal combustion engine 10 has a window in which the exhaust gas can be purified. The air-fuel ratio used in the internal combustion engine 10 cannot be changed beyond the window. There is also a restriction on the air-fuel ratio of the air-fuel mixture from the viewpoint of ensuring appropriate combustion. The air-fuel ratio used in the internal combustion engine 10 has to meet the restriction. In the following, an air-fuel ratio range that meets the both requirements will be referred to as an "allowable air-fuel ratio range" of the internal combustion engine 10.

Figure 2:
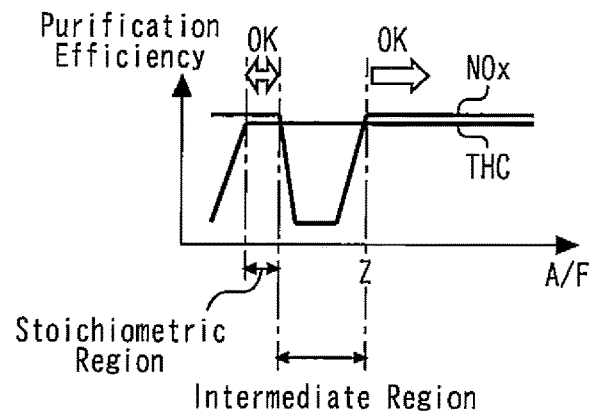
FIG. 2 shows exhaust gas purification characteristics of a purification system including a three-way catalyst and an NOx storage/reduction catalyst.

FIG. 2 shows a relationship between the exhaust gas purification efficiency of the three-way catalyst 58 and the NSR catalyst 60 and the air-fuel ratio A/F of the air-fuel mixture. In this specification, the exhaust gas "purification efficiency" refers to the degree of cleanliness of the exhaust gas discharged from the exhaust system. Thus, in FIG. 2, the condition where a high purification efficiency is obtained includes a condition in which the degree of cleanliness at a point downstream of the exhaust system is high because the internal combustion engine emits no impurity.

In FIG. 2, the region denoted as "stoichiometric region" is a region used in the stoichiometric control. "THC" in FIG. 2 generically means HC and CO (THC is an abbreviation of Total HC). The internal combustion engine 10 generates little NOx in a region in which the air-fuel ratio A/F of the air-fuel mixture is richer than that in the stoichiometric region. However, the richer the air-fuel ratio is, the more HC and CO the internal combustion engine 10 generates. Accordingly, in the region where the air-fuel ratio is richer than that in the stoichiometric region, the NOx purification efficiency is maintained at a high value, while the THC purification efficiency is lower as the air-fuel ratio is richer.

In a situation where the air-fuel ratio A/F of the air-fuel mixture belongs to the stoichiometric region, the internal combustion engine 10 generates mainly NOx when the air-fuel ratio is in leaner side while generating mainly HC and CO when the air-fuel ratio is in richer side. The three-way catalyst 58 purifies NOx if NOx is excessive by storing excessive oxygen in the exhaust gas, and purifies HC and CO if HC and CO are excessive by releasing the stored oxygen. Consequently, when the air-fuel ratio lies in the stoichiometric region, high purification efficiency is achieved for both NOx and THC due to the functionality of the three-way catalyst 58.

If the air-fuel ratio A/F of the air-fuel mixture becomes leaner beyond the upper limit of the stoichiometric region, the internal combustion engine 10 emits little HC and CO and begins to emit a large amount of NOx. The three-way catalyst 58 cannot continue purifying the large amount of NOx being continuously emitted. In addition, the NSR catalyst 60 exhibits a high NOx storage capacity under a situation in which the air-fuel ratio of the exhaust gas is markedly lean and the exhaust gas contains remarkable excessive oxygen. Thus, in the region where the air-fuel ratio is slightly leaner than that in the stoichiometric region, the NSR catalyst 60 may be unable to sufficiently purify the large amount of NOx emitted. Then, the NOx purification efficiency is at a low value in a weak-lean air-fuel ratio region that is close to the stoichiometric region, and is at a good value in a strong-lean region that is sufficiently far away from the stoichiometric region, or more specifically, a region where the air-fuel ratio is higher than a threshold Z. In the following, as shown in FIG. 2, a region between the stoichiometric region and the threshold Z, that is, a region where the NSR catalyst 60 cannot sufficiently purify the NOx in the exhaust gas will be referred to as an "intermediate region".

As described above, if the air-fuel ratio A/F is lean beyond the stoichiometric region, the internal combustion engine 10 generates little HC and CO. As shown in FIG. 2, the THC conversion efficiency is at a good value in the entire region where the air-fuel ratio is higher than the upper limit of the stoichiometric region. For the reason described above, the internal combustion engine 10 can ensure sufficient exhaust gas purification in the stoichiometric region and the lean region in which the air-fuel ratio is higher than the threshold Z.

Figure 3:
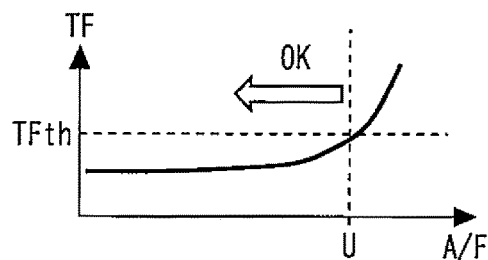
FIG. 3 shows a relationship between air-fuel ratio A/F of an air-fuel mixture and torque fluctuation (TF) arisen in an internal combustion engine.

FIG. 3 shows a relationship between the air-fuel ratio A/F of the air-fuel mixture and a torque fluctuation (TF) arisen in the internal combustion engine 10. The inflammability of the air-fuel mixture decreases as the air-fuel ratio becomes leaner. As the inflammability of the air-fuel mixture decreases, the stability of the engine torque deteriorates, and the torque fluctuation TF is more likely to occur. "TFth" in FIG. 3 denotes an upper limit value of the torque fluctuation that can be allowed from the viewpoint of drivability. "U" in FIG. 3 denotes a value that is defined based on the upper limit value TFth as an upper limit value of the air-fuel ratio with which combustion is ensured.

Figure 4:
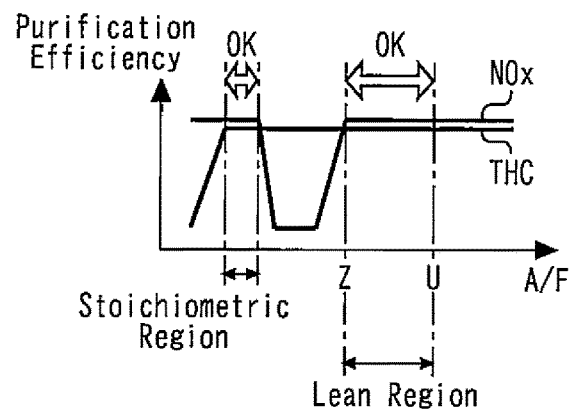
FIG. 4 is a diagram for explaining an allowable region of an air-fuel ratio in the internal combustion engine shown in FIG. 1.

FIG. 4 is a drawing in which the upper limit value U of the air-fuel ratio shown in FIG. 3 is added into the allowable region of the air-fuel ratio shown in FIG. 2. As shown in FIG. 4, the stoichiometric region having a certain width in the vicinity of the theoretical air-fuel ratio and the lean region having a certain width between the threshold Z and the upper limit value U are the "allowable air-fuel ratio range" that can be used in the internal combustion engine 10 according to this embodiment. In this specification, the "lean region" that can be used in the lean control agrees with the lean region shown in FIG. 4.

(Rich Control)

During the lean control, NOx emitted by the internal combustion engine 10 is continuously stored in the NSR catalyst 60. As this condition continues, the NSR catalyst 60 is saturated with NOx in due time. To avoid this, the ECU 70 calculates the cumulative amount of NOx flowing to the NSR catalyst 60 and performs a rich control when the cumulative amount reaches a criterion value that corresponds to the NOx saturation state to make the air-fuel ratio of the air-fuel mixture richer. The NSR catalyst 60 has a property of releasing the stored NOx when rich exhaust gas is supplied thereto. The NOx released is purified by a reducing agent such as HC or CO contained in the rich exhaust gas. Once the NOx is completely released, rich exhaust gas flows downstream of the NSR catalyst 60, and the output of the oxygen sensor 66 is inverted to rich. In response to this inversion, the ECU 70 ends the rich control, and resumes the lean control. In this way, the system according to this embodiment can substantially continuously perform the lean control without deterioration of the exhaust characteristics.

[Characteristics of First Embodiment]

(Change of Ventilation Amount Caused by Change of Air-Fuel Ratio A/F)

The system according to this embodiment achieves ventilation of the crankcase 24 by means of the PCV valve 28. As described above, the PCV valve 28 uses the negative pressure of the intake air to achieve ventilation of the in-case gas. If an operational state in which the negative pressure of the intake air is insufficient continues, the concentration of the blow-by gas in the crankcase 24 increases.

According to this embodiment, the air-fuel ratio A/F of the air-fuel mixture can be changed within the allowable air-fuel ratio range. If the air-fuel ratio A/F can be changed, the intake air amount Ga can be changed while suppressing a fluctuation of the engine torque. In the internal combustion engine 10, the intake air amount Ga is determined by the intake manifold pressure Pin and the intake valve characteristics InVVT. If the intake manifold pressure Pin changes, the ventilation amount of the PCV valve 28 also changes. Consequently, according to this embodiment, if the air-fuel ratio A/F is changed to reduce the intake manifold pressure Pin without changing the engine torque, the amount of ventilation of the in-case gas can be increased without deterioration of the drivability. If the change of the air-fuel ratio A/F is made within the allowable air-fuel ratio range, deterioration of the exhaust characteristics can be also avoided.

(Determination of Necessity of Ventilation)

According to this embodiment, the NOx concentration and the CO2 concentration in the crankcase 24 can be estimated in the methods described below. Thus, the ECU 70 can determine the necessity of ventilation of the crankcase 24 based on the estimated values.

(1) Estimation of NOx Concentration

An NOx concentration (a) in the crankcase 24 is responsive to a blow-by amount (b) of NOx that flows from the combustion chamber to the crankcase 24.

The NOx blow-by amount (b) is a product ((c)*(d)) of an NOx concentration (c) of the combustion gas and a blow-by gas amount (d) of gas that flows from the combustion chamber to the crankcase 24.

The NOx concentration (c) of the combustion gas is responsive to a combustion temperature (e) in a cylinder.

The combustion temperature (e) is correlated with a combustion pressure (f). Thus, the ECU 70 can estimate the NOx concentration (c) based on the output (f) of the combustion pressure sensor 15.

The blow-by gas amount (d) is responsive to a differential pressure (i) between an internal pressure (g) of the crankcase 24 and an in-cylinder pressure (h) and a gap (j) between a piston and a cylinder wall surface.

The in-case pressure (g) can be substituted with the atmospheric pressure, so that the differential pressure (i) can be estimated based on the in-cylinder pressure (h). The in-cylinder pressure (h) can be substituted with the combustion pressure (f) and can be determined from the output of the combustion pressure sensor 15. Thus, the ECU 70 can estimate the differential pressure (i) based on the output of the combustion pressure sensor 15.

The gap (j) between the piston and the cylinder wall surface depends on the temperature of the cylinder block, that is, the temperature of the cooling water. Thus, the ECU 70 can estimate the gap (j) based on the output of the water temperature sensor 20.

As described above, the ECU 70 can estimate both the differential pressure (i) and the gap (j). Consequently, the ECU 70 can estimate the blow-by gas amount (d) based on these values.

Furthermore, the ECU 70 can calculate the NOx blow-by amount (b) by multiplying the NOx concentration (c) estimated in the method described above by the blow-by gas amount (d). Furthermore, the ECU 70 can divide the NOx blow-by amount (b) by a volume (k) of the crankcase 24 to calculate the NOx concentration (a) (=(b)/(k)).

(2) Estimation of CO2 Concentration

A CO2 concentration (m) in the crankcase 24 is responsive to a blow-by amount (n) of CO2 that flows from the combustion chamber to the crankcase 24.

The CO2 blow-by amount (n) is a product ((o)*(d)) of a CO2 concentration (o) of the combustion gas and the blow-by gas amount (d) of gas that flows from the combustion chamber to the crankcase 24.

The CO2 concentration (o) of the combustion gas depends mainly on the air-fuel ratio A/F of the air-fuel mixture. Consequently, the ECU 70 can estimate the CO2 concentration (o) based on the air-fuel ratio A/F.

The blow-by gas amount (d) can be calculated in the same method as the NOx concentration. Thus, the ECU 70 can calculate the CO2 blow-by amount (n) by multiplying the CO2 concentration (o) by the blow-by gas amount (d). Furthermore, the ECU 70 can calculate the CO2 concentration (m)=(n)/(k) by dividing the CO2 blow-by amount (n) by the volume (k) of the crankcase 24.

(3) Determination

As described above, the system according to this embodiment can estimate the NOx concentration and the CO2 concentration in the crankcase 24. Under a condition where the NOx concentration and the CO2 concentration are sufficiently low, ventilation does not have to be promoted. Under a condition where the NOx concentration or the CO2 concentration is high, however, ventilation is preferably promoted in order to keep the interior of the crankcase 24 clean. In view of this fact, it is determined that ventilation is necessary and a ventilation request is issued when the NOx concentration or the CO2 concentration in the crankcase 24 reaches a ventilation request value according to this embodiment.

(Operation before and after Issue of Ventilation Request)

Figure 5:
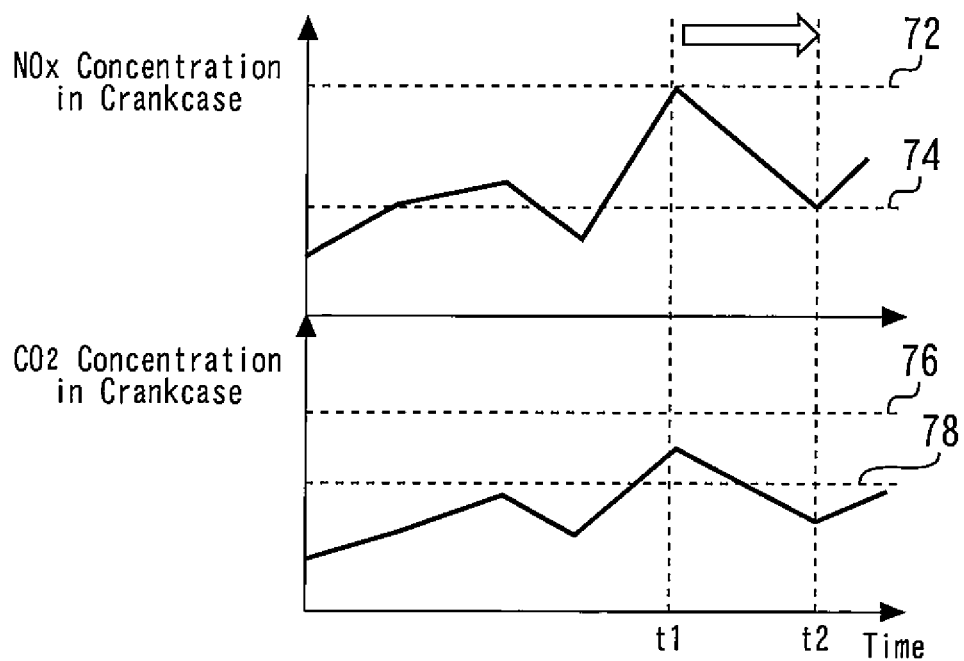
FIG. 5 is a timing chart showing an example of an operation of the first embodiment of the present invention before and after a ventilation request is issued.

FIG. 5 is a timing chart showing an example of an operation of the internal combustion engine 10 before and after the ventilation request is issued. The four dashed lines shown in FIG. 5 indicate the following values, respectively.

Dashed line 72: ventilation request value for NOx concentration

Dashed line 74: ventilation end criterion value for NOx concentration

Dashed line 76: ventilation request value for CO2 concentration

Dashed line 78: ventilation end criterion value for CO2 concentration

In the example shown in FIG. 5, ventilation is appropriately performed by natural ventilation until time t1, and the NOx concentration in the crankcase 24 reaches the ventilation request value 72 at the time t1. At the time t1, the CO2 concentration does not reach the ventilation request value 76. However, according to this embodiment, an air-fuel ratio control to promote ventilation (referred to as a "ventilation control", hereinafter) is started at the time t1. As a result, from the time t1, the ventilation amount of the in-case gas increases, and the NOx concentration and the CO2 concentration decrease.

According to this embodiment, the ventilation control described above continues until both the NOx concentration and the CO2 concentration in the crankcase 24 decrease below the respective ventilation end criterion values. Thus, in the example shown in FIG. 5, even if the CO2 concentration decreases below the ventilation end criterion value 78, the ventilation control continues until a time t2 when the NOx concentration is lowered to the ventilation end criterion value 74. By this step, ventilation of the in-case gas can be promoted as required, and the interior of the crankcase 24 can be always kept clean.

(Flowchart according to First Embodiment)

Figure 6:
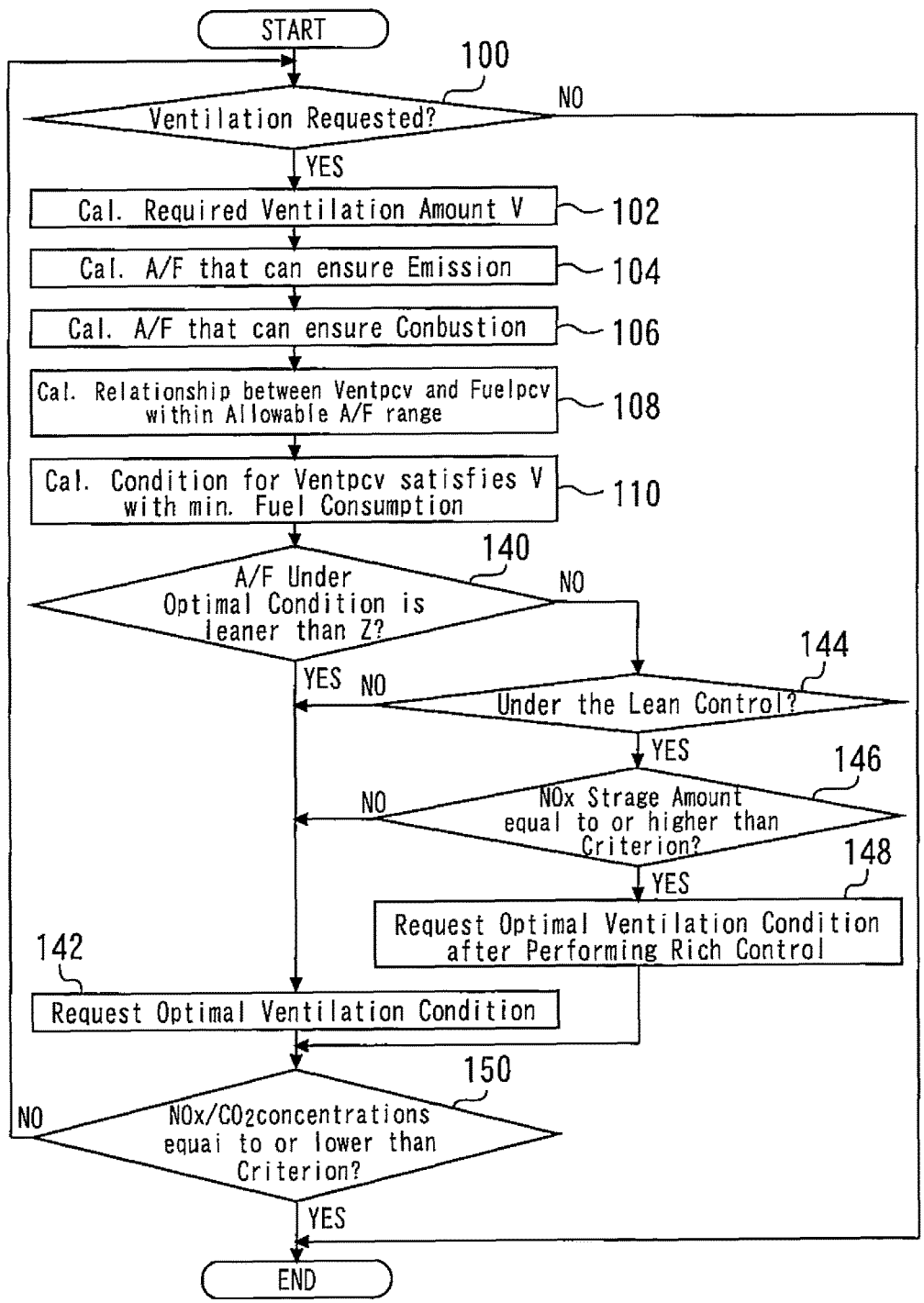
FIG. 6 is a flowchart showing a main routine performed in the first embodiment of the present invention.

In the following, with reference to FIGS. 6 to 17, a routine performed by the ECU 70 to perform the ventilation control described above will be described. FIG. 6 is a flowchart showing a main routine performed by the ECU 70 according to this embodiment. The ECU 70 performs the routine shown in FIG. 6 at a predetermined cycle after the internal combustion engine 10 starts running.

In the routine shown in FIG. 6, first, it is determined whether a ventilation request is issued or not (Step 100). Once the internal combustion engine 10 starts running, the ECU 70 constantly calculates the NOx concentration and the CO2 concentration in the crankcase 24 in the methods described above. In Step 100, the calculated NOx concentration and CO2 concentration are compared with the respective ventilation criterion values (shown by the dashed lines 72 and 76 in FIG. 5), and it is determined that a ventilation request is issued if any of the concentrations reaches the ventilation criterion value.

If it is determined in the above step that no ventilation request is issued, since the ventilation control is unnecessary, the routine is immediately ended. If it is determined that a ventilation request is issued, a required ventilation amount V per unit time is then calculated (Step 102).

Figure 7:
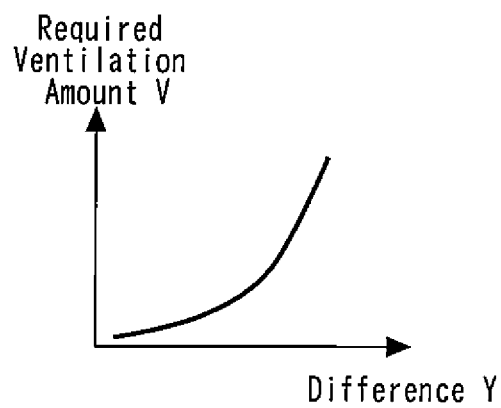
FIG. 7 is an example of a map related with a required ventilation amount V referred to in Step 102 shown in FIG. 6.

FIG. 7 is a map showing the required ventilation amount V referred to by the ECU 70 in Step 102 described above. This map defines the required ventilation amount V in association with a difference Y. The map shown in FIG. 7 is configured so that the greater the difference Y is, the larger the required ventilation amount V is. In Step 102, the ECU 70 firstly calculates the differences Y between the current NOx concentration and the current CO2 concentration and the respective ventilation end criterion values (shown by the dashed lines 74 and 78 in FIG. 5). The ECU 70 then refers to the map shown in FIG. 7 to determine the required ventilation amount V corresponding to the differences Y. In this step, the greater the difference between the current NOx concentration or the current CO2 concentration and the ventilation end criterion value 74 or 78 is, the larger the value of the required ventilation amount V is.

Once the processing described above ends, the air-fuel ratio A/F that can ensure emission quality while maintaining the current engine speed NE and the current engine torque TRQ is then calculated (Step 104). The ECU 70 stores a map that defines in association with the engine speed NE and the engine torque TRQ the allowable air-fuel ratio range shown in FIG. 2, that is, the allowable air-fuel ratio range determined from the viewpoint of purification capacity. In Step 104, the range of the air-fuel ratio A/F that can ensure emission quality under the current operational condition is determined by referring to the map.

The air-fuel ratio A/F that can ensure combustion is then calculated (Step 106). The ECU 70 stores a map that defines the upper limit value U of the air-fuel ratio shown in FIG. 3, that is, the upper limit value U of the air-fuel ratio that can ensure combustion, in association with the engine speed NE and the engine torque TRQ. In Step 106, the upper limit value U of the air-fuel ratio that can ensure combustion under the current operational condition is determined by referring to the map. Once this processing ends, the ECU 70 can determine the allowable air-fuel ratio region (see FIG. 4) at the current engine speed NE and engine torque TRQ.

The ECU 70 then calculates a relationship that holds between a ventilation amount Ventpcv of the PCV valve 28 and a fuel consumption Fuelpcv resulting from the ventilation by the PCV valve 28 within the allowable air-fuel ratio range (Step 108).

Based on this relationship, the ECU 70 then calculates an operational condition under which the ventilation amount Ventpcv that meets the required ventilation amount V is achieved with the minimum fuel consumption Fuelpcv (Step 110).

Figure 8:
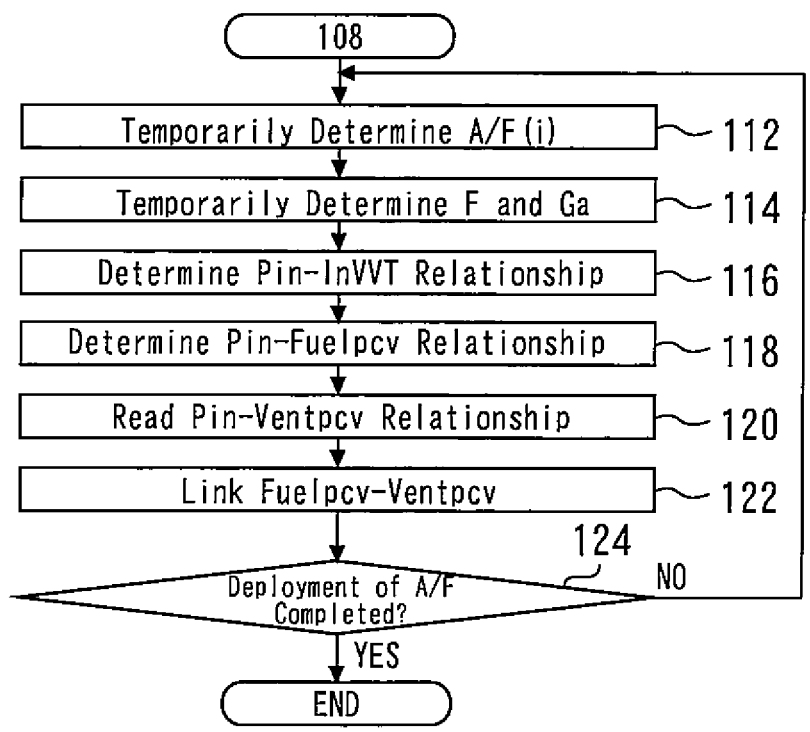
FIG. 8 is a flowchart for illustrating details of a process performed in Step 108 shown in FIG. 6.

FIG. 8 is a flowchart for illustrating details of a process performed in Step 108 described above. As shown in FIG. 8, in Step 108, an air-fuel ratio A/F(i) is temporarily determined within the allowable air-fuel ratio range (Step 112).

A fuel injection amount F and an intake air amount Ga are then temporarily determined (Step 114).

Figure 9:
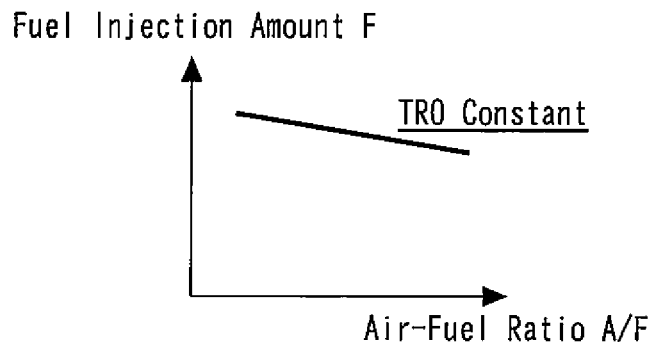
FIG. 9 shows a relationship between an air-fuel ratio A/F and a fuel injection amount F that maintains a constant engine torque.

FIG. 9 shows an example of a relationship between the air-fuel ratio A/F and the fuel injection amount F that maintains a constant engine torque TRQ. The ECU 70 stores this relationship for each engine torque TRQ. in Step 114, first, the relationship that holds between the air-fuel ratio A/F and the injection amount F at the current torque TRQ, such as that shown in FIG. 9, is read. Based on the relationship, the injection amount F that corresponds to the air-fuel ratio A/F(i) temporarily determined in Step 112 is then read. By this processing, the injection amount F that maintains a constant engine torque TRQ at the temporarily determined air-fuel ratio A/F(i) can be temporarily determined.

Figure 10:
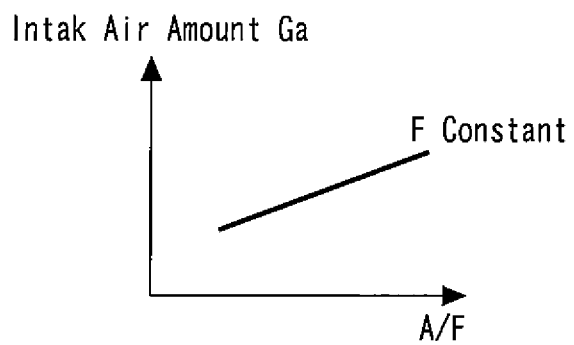
FIG. 10 shows a relationship that holds between an air-fuel ratio A/F and an intake air amount Ga under a constant injection amount F.

FIG. 10 shows a relationship that holds between the air-fuel ratio A/F and the intake air amount Ga when the injection amount F is constant. The air-fuel ratio A/F is the intake air amount Ga divided by the injection amount F. Therefore, if the injection amount F is constant, a proportional relationship holds between the intake air amount Ga and the air-fuel ratio A/F as shown in FIG. 10. Thus, once the air-fuel ratio A/F(i) and the injection amount F are temporarily determined, the intake air amount Ga can be calculated based on the values A/F(i) and F. In Step 114, as described above, after the injection amount F is temporarily determined, the air-fuel ratio A/F(i) is multiplied by the injection amount F to temporarily determine the intake air amount Ga.

Figure 11:
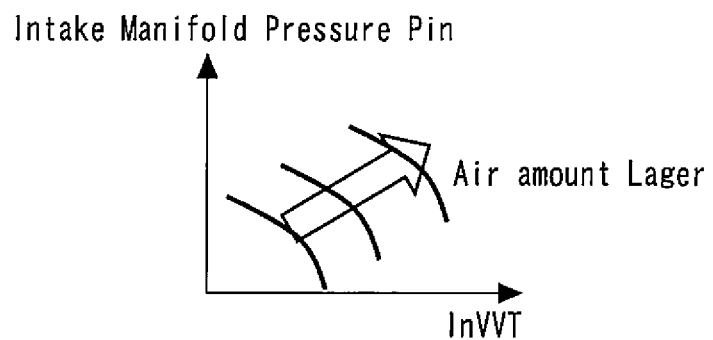
FIG. 11 is a diagram showing a relationship between an intake manifold pressure Pin and an intake valve characteristics InVVT using an intake air amount Ga as a parameter.

Once the processing described above ends, a Pin-InVVT relationship is then read from the relationship shown in FIG. 11 (Step 116).

FIG. 11 is a diagram showing a relationship between the intake manifold pressure Pin and the intake valve characteristics InVVT using the intake air amount Ga as a parameter. From the relationship shown in FIG. 11, the following phenomena can be read. Note that, the intake valve characteristics InVVT in FIG. 11 is synonymous with the timing of opening of the intake valve, and the greater the value is, the more significantly the timing of opening is retarded.

1. If the intake manifold pressure Pin is fixed, the greater the intake valve characteristics InVVT is (in other words, the more significantly the intake valve characteristics InVVT is retarded), the larger the intake air amount Ga is.

2. If the intake valve characteristics InVVT is fixed, the higher the intake manifold pressure Pin is, the larger the intake air amount Ga is.

3. To keep the intake air amount Ga constant, the intake manifold pressure Pin needs to be reduced as the intake valve characteristics InVVT is retarded, and the intake valve characteristics InVVT needs to be advanced as the intake manifold pressure increases.

The ECU 70 stores the relationship shown in FIG. 11 for the internal combustion engine 10. In Step 116, from the relationship shown in FIG. 11, a relationship for the intake air amount Ga temporarily determined in Step 114 is read, and the relationship is designated as the Pin-InVVT relationship.

Once the processing described above ends, a relationship between the fuel consumption Fuelpcv resulting from the ventilation by the PCV valve 28 and the intake manifold pressure Pin is determined (Step 118). The pump loss of the internal combustion engine 10 is mainly determined by the intake manifold pressure Pin and the intake valve characteristics InVVT. Under a condition where the intake air amount Ga is determined, the Pin-InVVT relationship is determined, thus InVVT is a function of Pin. Accordingly, under this condition, the pump loss of the internal combustion engine 10 is mainly determined by Pin.

Figure 12:
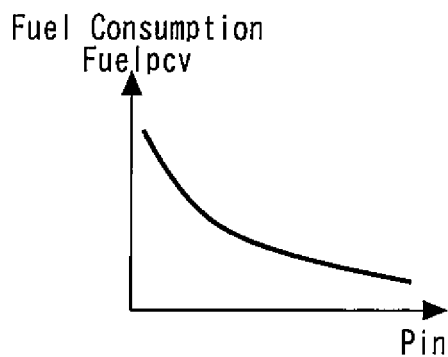
FIG. 12 shows a relationship that holds between an intake manifold pressure Pin and a fuel consumption Fuelpcv.

FIG. 12 shows an example of the relationship that holds between the intake manifold pressure Pin and the fuel consumption Fuelpcv when the intake air amount Ga is determined. This relationship shows that, as Pin decreases, the pump loss in the intake stroke increases, and the fuel consumption amount (fuel consumption) Fuelpcv increases. The ECU 70 stores a relationship similar to that shown in FIG. 12 for each intake air amount Ga. In step 118, among those relationships, a relationship that is suitable for the intake air amount Ga temporarily determined is identified as the Pin-Fuelpcv relationship.

A relationship between the ventilation amount Ventpcv resulting from the ventilation by the PCV valve 28 and the intake manifold pressure Pin is then read (Step 120).

Figure 13:
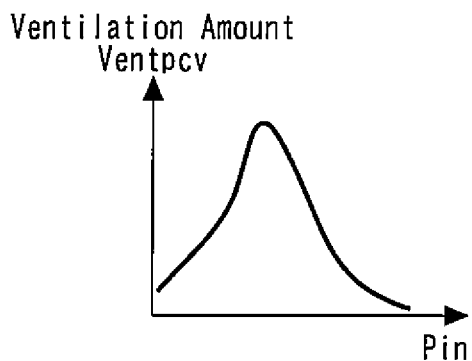
FIG. 13 shows a relationship that holds between an intake manifold pressure Pin and a PCV ventilation amount Ventpcv.

FIG. 13 shows a relationship that holds between Ventpcv and Pin in the internal combustion engine 10. The ECU 70 stores the relationship shown in FIG. 13. In Step 120, this relationship is read as the Pin-Ventpcv relationship.

Next, the fuel consumption Fuelpcv and the ventilation amount Ventpcv are linked with each other (Step 122).

Figure 14:
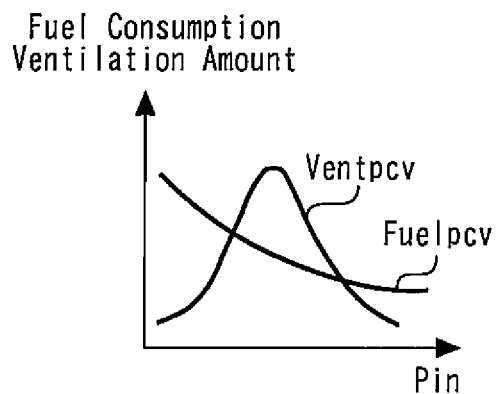
FIG. 14 is a diagram for explaining the relationship that holds between the fuel consumption Fuelpcv and the PCV ventilation amount Ventpcv.

FIG. 14 schematically shows an example of the result of the processing in Step 122. Both the Pin-Fuelpcv relationship determined in Step 118 and the Pin-Ventpcv relationship read in Step 120 commonly have an axis of Pin. Therefore, the fuel consumption Fuelpcv and the ventilation amount Ventpcv can be linked with each other via the intake manifold pressure Pin as shown in FIG. 14.

Once the processing described above ends, it is determined whether deployment of the A/F(i) over the entire allowable air-fuel ratio range is completed or not (Step 124). If it is determined that the deployment of the A/F(i) is not completed, the procedure from Step 112 is performed again for a different value of A/F(i). If it is determined that the deployment of the A/F(i) is completed, the series of processings shown in FIG. 8 is terminated.

Figure 15:
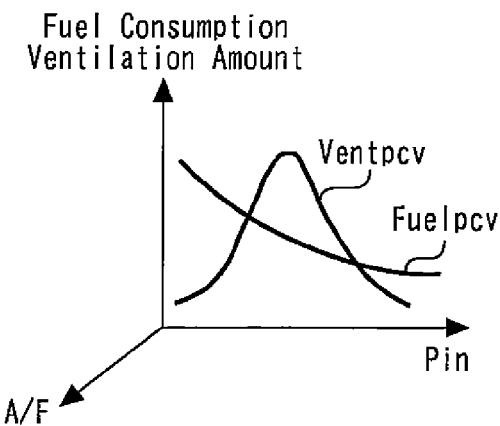
FIG. 15 schematically shows the result obtained by the procedure performed in Step 108 shown in FIG. 6.

FIG. 15 schematically shows the Fuelpcv-Ventpcv relationship stored in the ECU 70 at the time when the series of processings shown in FIG. 8 is ended. As shown in FIG. 15, by the series of processings shown in FIG. 8, information on the fuel consumption Fuelpcv and the ventilation amount Ventpcv combined via Pin can be obtained for the entire allowable air-fuel ratio range.

Figure 16:
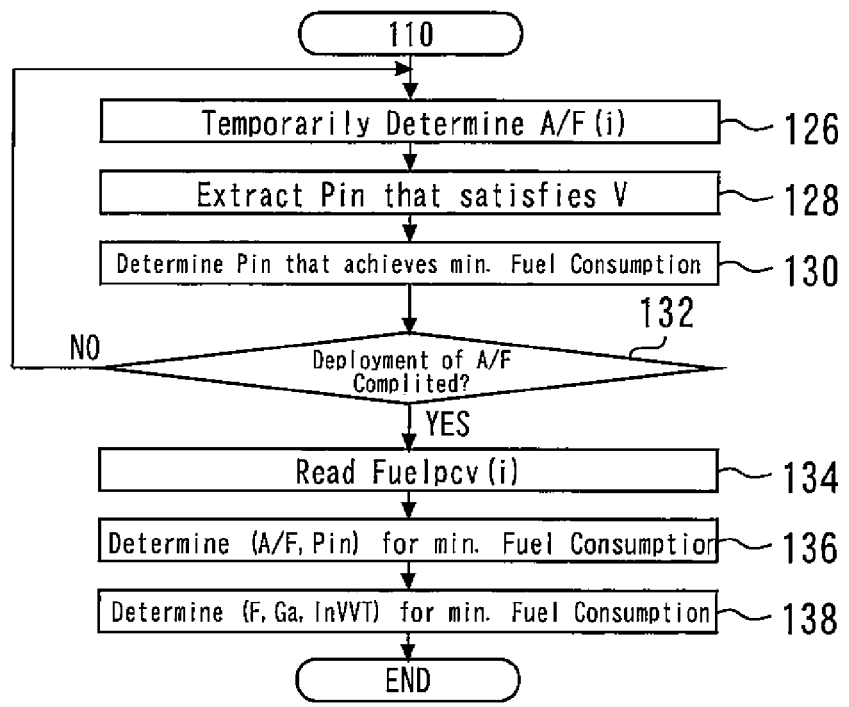
FIG. 16 is a flowchart for illustrating details of a process performed in Step 110 shown in FIG. 6.

FIG. 16 is a flowchart for illustrating details of the processing performed in Step 110 in the main routine shown in FIG. 6. The series of processings shown in FIG. 16 is performed to calculate, based on the relationship shown in FIG. 15 described above, the operational condition under which the ventilation Ventpcv that meets the required ventilation amount V is achieved with the minimum fuel consumption.

In the series of processings shown in FIG. 16, first, the air-fuel ratio A/F(i) is temporarily determined (Step 126). The processing of Step 126 is performed for the information shown in FIG. 15. The information shown in FIG. 15 is obtained by deploying the Fuelpcv-Ventpcv relationship shown in FIG. 14 over the entire allowable air-fuel ratio range. Thus, once the A/F(i) is temporarily determined for the information shown in FIG. 15, the Fuelpcv-Ventpcv relationship that holds at the A/F(i), that is, a relationship similar to that shown in FIG. 14, is determined.

Once the processing described above ends, from the determined Fuelpcv-Ventpcv relationship, the intake manifold pressure Pin at which the ventilation amount Ventpcv that meets the required ventilation amount V occurs is extracted (Step 128). It should be noted that the required ventilation amount V is the value calculated in Step 102 in FIG. 6.

Figure 17:
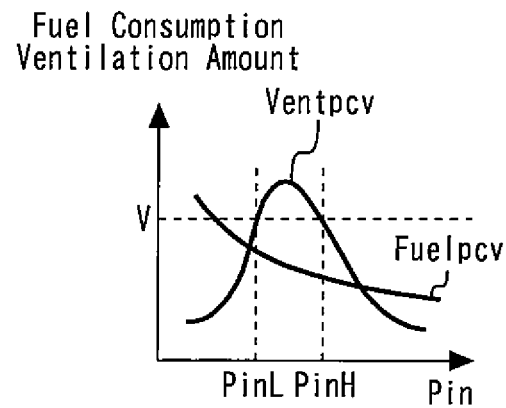
FIG. 17 is a diagram for concretely explaining the procedure performed in Step 128 shown in FIG. 16.

FIG. 17 is a diagram in which the required ventilation amount V is added to the relationship determined in Step 126. In the example shown in FIG. 17, the ventilation amount Ventpcv meets the required ventilation amount V when the intake manifold pressure Pin satisfies a relationship PinL≤Pin≤PinH. Thus, in this case, the range from PinL to PinH is extracted as the Pin that meets the required ventilation amount V.

From the intake manifold pressure Pin extracted in the above processing, an intake manifold pressure Pin that achieves the minimum fuel consumption (referred to as "Pin(i)", hereinafter) is determined (Step 130). In the example shown in FIG. 17, among the intake manifold pressures Pin that satisfy the relationship PinL≤Pin≤PinH, the intake manifold pressure that achieves the minimum fuel consumption is PinH. Thus, in this case, PinH is designated as Pin(i).

It is then determined whether deployment of A/F(i) is completed or not over the entire allowable air-fuel ratio range (Step 132). If the deployment of A/F(i) is not completed over the entire allowable air-fuel ratio range, the procedure from Step 126 is performed again for a different A/F(i). If it is determined that the deployment of A/F(i) is completed, it can be determined that the intake manifold pressure Pin(i) that achieves the minimum fuel consumption is determined over the entire allowable air-fuel ratio range.

Once the processing described above ends, a minimum fuel consumption Fuelpcv(i) that is achieved at Pin(i) is read for the entire allowable air-fuel ratio range (Step 134).

Figure 18:
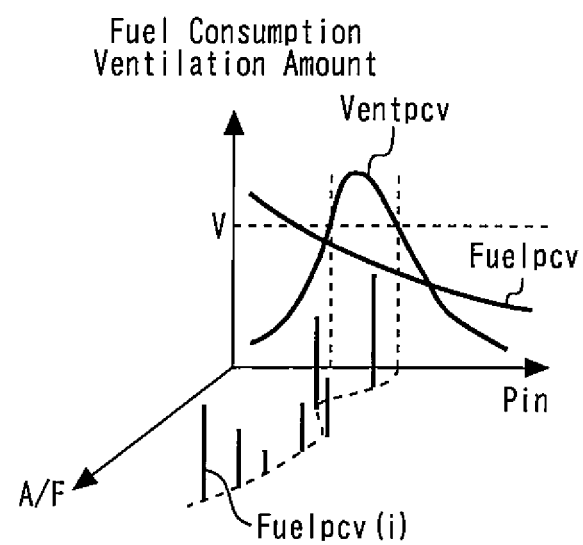
FIG. 18 is a diagram for concretely explaining the procedure performed in Step 134 shown in FIG. 16.

FIG. 18 is a bar graph that shows a plurality of values of the minimum fuel consumption Fuelpcv(i) in a two-dimensional coordinate system of Pin and A/F. By the processing of Step 134, the heights of the bars shown in FIG. 18 are read from the entire allowable air-fuel ratio range.

From all the read values of the minimum fuel consumption Fuelpcv(i), the minimum one is then determined. And A/F and Pin that achieve the minimum Fuelpcv(i) is determined (Step 136). By this processing, from among the combinations of A/F and Pin that satisfy the relationship shown in FIG. 15, the combination (A/F, Pin) that achieves the required ventilation amount V with the minimum fuel consumption can be determined.

Once the processing described above ends, the operational condition of the internal combustion engine 10 that meets the required ventilation amount V with the minimum fuel consumption is then determined. That is, other parameters (F, Ga, InVVT) that are to be used with the combination (A/F, Pin) determined in Step 136 are determined (Step 138).

According to this embodiment, the processing of determining the combination (A/F, Pin) that achieves the minimum fuel consumption is performed based on the relationship shown in FIG. 15 as described above. In the course of determination of the relationship shown in FIG. 15, the fuel injection amount F is determined for each A/F(i) so that the torque TRQ is kept constant (see Step 114 in FIG. 8 and FIG. 9). Thus, under the relationship shown in FIG. 15, the air-fuel ratio A/F(i) and the fuel injection amount F are in a one-to-one relationship, and the fuel injection amount F is naturally determined when the air-fuel ratio A/F(i) is determined. Furthermore, if the fuel injection amount F is determined in the environment in which the air-fuel ratio A/F(i) is determined, the intake air amount Ga is also naturally determined.

Furthermore, the relationship shown in FIG. 15 is based on the assumption that the Pin-InVVT relationship is determined when the intake air amount Ga is determined (see Step 116 in FIG. 8 and FIG. 11). Therefore, if the intake air amount Ga is determined, the Pin-InVVT relationship is also naturally determined. Since Pin(i) is determined along with A/F(i) in the above Step 136, under the situation in which the Pin-InVVT relationship is determined, InVVT is also naturally determined.

As described above, according to this embodiment, when A/F(i) and Pin(i) are determined, the fuel injection amount F, the intake air amount Ga and the intake valve characteristics InVVT are necessarily determined. More specifically, in Step 138, the following processings are performed to determine these values.

1. Based on the A/F(i) determined in Step 136, the injection amount F is determined from the relationship shown in FIG. 9.

2. Based on the A/F(i) determined in Step 136 and the F determined in the above processing, the intake air amount Ga is determined from the relationship shown in FIG. 10.

3. From the relationship shown in FIG. 11, the Pin-InVVT relationship for the Ga determined in the above processing is determined. The Pin determined in Step 136 is then applied to the Pin-InVVT relationship to determine the intake valve characteristics InVVT.

By the process described above, the combination of A/F, Pin, F, Ga and InVVT that can meet the required ventilation amount V with the minimum fuel consumption can be determined. In addition, the determined air-fuel ratio A/F falls within the allowable air-fuel ratio range. Further, the fuel injection amount F is determined to be a value that maintains a constant engine torque TRQ before and after the air-fuel ratio A/F is changed. Thus, under the operational condition that conforms with the above combination, ventilation of the crankcase 24 can be appropriately promoted with the minimum fuel consumption without deteriorating the exhaust characteristics and the drivability. In the following, this condition will be referred to as an "optimal ventilation condition", and an operation under the condition is referred to as an "optimal ventilation operation".

In the following, referring to FIG. 6 again, the main routine performed in this embodiment will be described. In the routine shown in FIG. 6, following the processing of Step 110, it is determined whether the air-fuel ratio A/F under the optimal ventilation condition is leaner than the threshold Z or not (Step 140). The threshold Z is the upper limit value of the intermediate region beyond which the NOx conversion efficiency decreases (see FIG. 4).

According to this embodiment, the ECU 70 performs the air-fuel ratio control in such a manner that the air-fuel ratio of the air-fuel mixture falls within the allowable air-fuel ratio range. Therefore, the air-fuel ratio used in the internal combustion engine 10 lies in the lean region or the stoichiometric region.

If it is determined in Step 140 that the air-fuel ratio under the optimal ventilation condition is leaner than the threshold Z, it can be determined that the optimal ventilation operation occurs in the lean region. If the current air-fuel ratio lies in the lean region, it can be determined that any change of the air-fuel ratio at the start of the optimal ventilation operation falls within the lean region. If the air-fuel ratio of the air-fuel mixture is continuously maintained in the lean region, no significant change occurs in the state of the NSR catalyst 60 before and after the optimal ventilation operation starts. Therefore, in this case, there is no concern that NOx flows over the NSR catalyst 60 at the start of the optimal ventilation operation.

On the other hand, if the air-fuel ratio under the optimal ventilation condition is leaner than the threshold Z, and the current air-fuel ratio lies in the stoichiometric region, the air-fuel ratio changes across the intermediate region at the start of the optimal ventilation operation. A large amount of NOx is generated in the intermediate region, so that the NSR catalyst 60 is likely to be saturated with NOx in the course of the change of the air-fuel ratio. However, during the stoichiometric control, a smaller amount of NOx is generated, and the NSR catalyst 60 generally has a sufficient NOx storage capacity. Thus, when the air-fuel ratio changes from the stoichiometric region to the lean region across the intermediate region, the NSR catalyst 60 can sufficiently absorb the NOx generated in the course of the change of the air-fuel ratio.

For the reason described above, according to this embodiment, if the result of the determination in Step 140 is affirmative, it can be determined that the optimal ventilation operation can be started without concern for release of NOx into the atmosphere. Then, an operation under the optimal ventilation condition is immediately requested (Step 142). As a result, the internal combustion engine 10 starts the optimal ventilation operation, and ventilation of the crankcase 24 starts being promoted without deteriorating the exhaust characteristics and the drivability.

In the routine shown in FIG. 6, if it is determined in Step 140 that the air-fuel ratio under the optimal ventilation condition is not leaner than the threshold Z, it can be determined that the air-fuel ratio does not lie in the lean region. In this embodiment, the air-fuel ratio of the air-fuel mixture always falls within the allowable air-fuel ratio range, that is, the lean region or the stoichiometric region, and therefore, if the air-fuel ratio does not lie in the lean region, it can be determined that the air-fuel ratio lies in the stoichiometric region. In this case, the ECU 70 then determines whether the current air-fuel ratio control is the lean control or not (Step 144).

If the result of the determination in Step 144 is negative, it can be determined that the current air-fuel ratio control is the stoichiometric control. In this case, it can be determined that the current air-fuel ratio lies in the stoichiometric region, and the air-fuel ratio under the optimal ventilation condition also lies in the stoichiometric region. If the air-fuel ratio is continuously maintained in the stoichiometric region, the three-way catalyst 58 can continue to appropriately purify the exhaust gas. In this case also, the ECU 70 determines that the operation can be shifted to the optimal ventilation operation without deteriorating the exhaust characteristics and immediately performs the processing of Step 142.

If it is determined in Step 144 that the current air-fuel ratio control is the lean control, it can be determined that the air-fuel ratio changes from the lean region to the stoichiometric region across the intermediate region at the start of the optimal ventilation operation. In this case, the ECU 70 then determines whether or not the NOx storage amount of the NSR catalyst 60 is equal to or higher than a criterion value for requesting NOx release (Step 146).

If the air-fuel ratio changes across the intermediate region, a large amount of NOx is temporarily generated. If the NSR catalyst 60 has a sufficient NOx storage capacity, the generated NOx is caught by the NSR catalyst 60 and is not released into the atmosphere. Thus, if the result of the determination in Step 146 is negative, it can be determined that the NSR catalyst 60 still has a sufficient NOx storage capacity. In this case, the ECU 70 determines that no NOx is released into the atmosphere and immediately performs the processing of Step 142.

If it is determined in Step 146 that the NOx storage amount is equal to or higher than the criterion value, it can be determined that a large amount of NOx is released into the atmosphere when the air-fuel ratio changes across the intermediate region. In this case, the ECU 70 requests for an operation under the optimal ventilation condition after performing the rich control (Step 148). If the rich control occurs, the NSR catalyst 60 releases NOx and restores the NOx storage capacity. Once the NSR catalyst 60 restores the NOx storage capacity, even if the air-fuel ratio changes across the intermediate region, the generated NOx is caught by the NSR catalyst 60 and is not released into the atmosphere. By this processing, good exhaust characteristics can be maintained even when the air-fuel ratio changes from the lean region to the stoichiometric region at the start of the optimal ventilation operation.

In the routine shown in FIG. 6, following the above processing, it is determined whether or not the NOx concentration and the CO2 concentration in the crankcase 24 decrease to be equal to or lower than the respective ventilation end criterion values (Step 150). If it is determined that any of the concentrations has not decreased to the ventilation end criterion value, the procedure from Step 100 is repeated. If it is determined that both the NOx concentration and the CO2 concentration have decreased to be equal or lower than the respective ventilation end criterion values, the request for an operation under the optimal ventilation condition is withdrawn, and the routine then ends.

As described above, according to this embodiment, if the NOx concentration or the CO2 concentration in the crankcase increases to the respective request criterion values as a result of natural ventilation by the PCV valve 28, the optimal ventilation operation is performed to increase the ventilation amount of the in-case gas. In this process, the air-fuel ratio changes within the allowable air-fuel ratio range. If the air-fuel ratio changes across the intermediate region after the start of the optimal ventilation operation, the restoration processing (rich control) for the NSR catalyst 60 is also performed as required. Furthermore, in the optimal ventilation operation, the fuel injection amount F that maintains a constant engine torque is used. Consequently, according to the present embodiment, ventilation can be appropriately promoted with the minimum fuel consumption without deteriorating the exhaust characteristics and the drivability.

[Examples of Modification of First Embodiment]

In the first embodiment described above, the PCV valve 28 is in communication with the interior space of the crankcase 24. However, the present invention is not limited to this configuration. For example, if the interior space of the crankcase 24 is in communication with the space inside a head cover, the PCV valve 28 may be in communication with the internal space of a cylinder head.

In the first embodiment described above, a ventilation request is issued when the NOx concentration or the CO2 concentration in the crankcase reaches the ventilation criterion value, the method of issuing the ventilation request is not limited to this method. The ventilation request may be periodically issued at predetermined time intervals, for example. Alternatively, the ventilation request may be appropriately issued at predetermined travel distances.

In the first embodiment described above, the required ventilation amount V is set based on the NOx concentration and the CO2 concentration in the crankcase, and the ventilation condition is set so as to meet the required ventilation amount V. However, the present invention is not limited to this implementation. For example, the required ventilation amount V may be an arbitrary value higher than the current ventilation amount, and the ventilation condition may be set so as to meet the arbitrary value.

In the first embodiment described above, the rich control is performed only when the air-fuel ratio changes from the lean region to the stoichiometric region at the start of promotion of ventilation. However, the present invention is not limited to this implementation. The rich control can be additionally performed when the air-fuel ratio changes from the stoichiometric region to the lean region at the start of promotion of ventilation.

In the first embodiment described above, the ECU 70 calculates the allowable air-fuel ratio range onboard. However, the allowable air-fuel ratio range may be experimentally determined for the internal combustion engine 10 in advance through an adaptation process. For example, the allowable air-fuel ratio range may be previously mapped through an adaptation process while using at least some of parameters that has an effect on the withstand combustion pressure, such as the engine speed NE, the engine load KL (intake air amount Ga), the air-fuel ratio A/F, the ignition timing, the intake valve characteristics InVVT, the fuel injection timing and the ratio between the in-cylinder fuel injection and the port fuel injection as an axis. The ECU 70 can store the map and read the allowable air-fuel ratio range from the map in response to the operational state of the internal combustion engine 10.

The four modifications described above are possible in the second embodiment described later.

In the first embodiment described above, ventilation is promoted under the optimal ventilation condition by determining the air-fuel ratio A/F(i) that achieves the minimum fuel consumption within the allowable air-fuel ratio range. However, the present invention is not limited to this implementation. For example, the requirement of the minimum fuel consumption may be eliminated, and ventilation may be promoted under a ventilation condition that meets the required ventilation amount V. This modification can be made by performing the following processings in Step 110 shown in FIG. 6.

1. One combination of A/F and Pin that meets the required ventilation amount V is determined.
2. For the combination, F, Ga and InVVT are determined in the same method as that according to the first embodiment.
3. The combination of various parameters determined in the processings 1 and 2 described above is set as a ventilation condition that is substituted for the optimal ventilation condition.

Second Embodiment
[Configuration of Second Embodiment]

Figure 19:
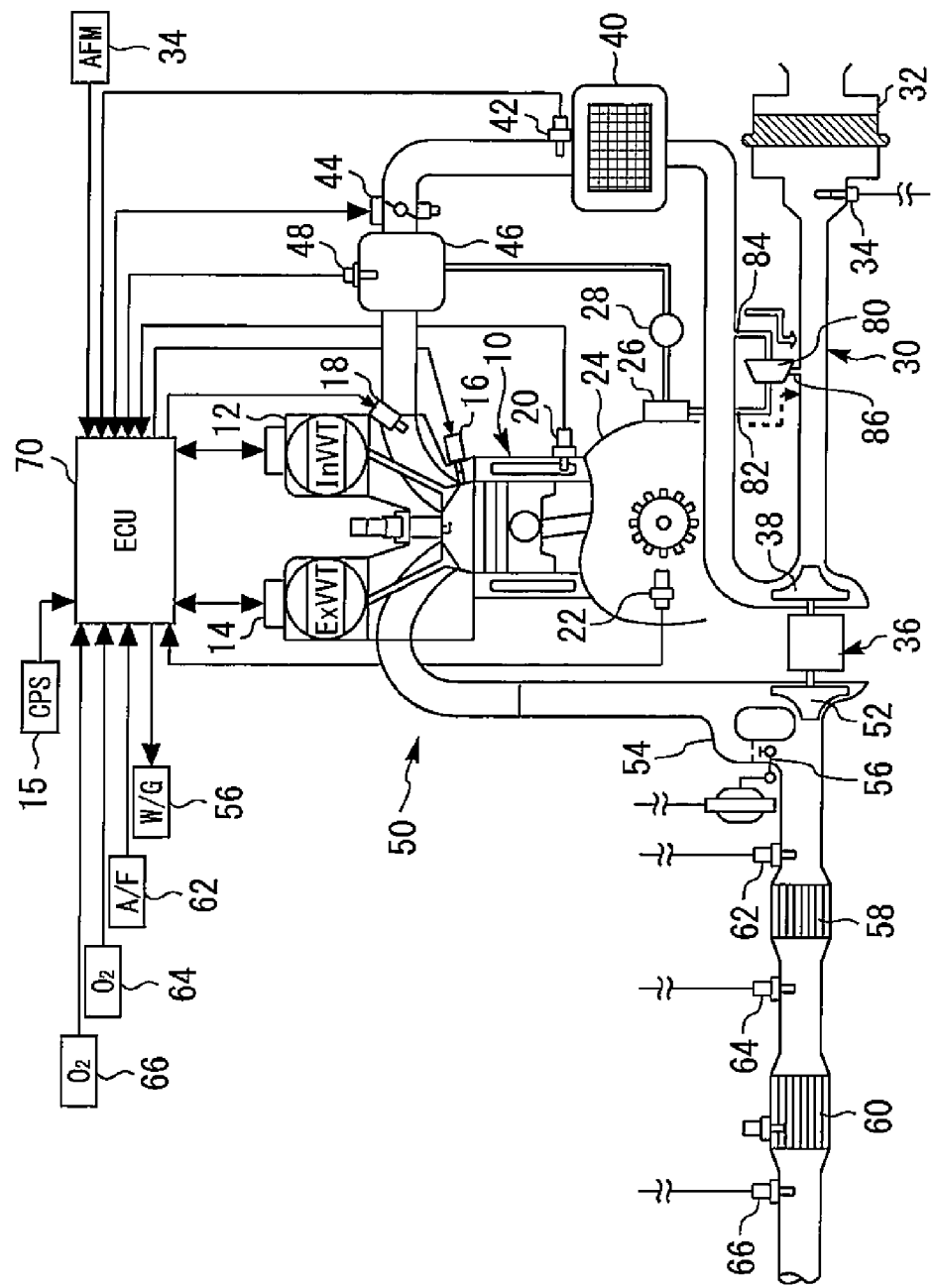
FIG. 19 is a diagram for explaining the configuration of a second embodiment of the present invention.

FIG. 19 is a diagram for illustrating a configuration of a second embodiment of the present invention. In the following, the elements shown in FIG. 19 that are the same as those shown in FIG. 1 will be denoted by the same reference numerals as those in FIG. 1, and descriptions thereof will be omitted or simplified.

The configuration shown in FIG. 19 is basically the same as the configuration shown in FIG. 1 except that the intake passage 30 of the internal combustion engine 10 is provided with an ejector 80. The ejector 80 is in communication with the oil separator 26 via a gas channel 82. Furthermore, the ejector 80 is in communication with a part downstream of the compressor 38 via a high pressure channel 84. Furthermore, the ejector 80 is in communication with a part upstream of the compressor 38 via a low pressure channel 86.

If the supercharging pressure Psc increases during operation of the internal combustion engine 10, a pressure difference occurs between the high pressure channel 84 and the low pressure channel 86. As a result, an air flow from the high pressure channel 84 to the low pressure channel 86 occurs in the ejector 80. The ejector 80 uses the air flow to suck the in-case gas from the gas channel 82. The sucked in-case gas flows to the part upstream of the compressor 38 along with the air flowing in the ejector 80.

As described above, the ejector 80 can ventilate the in-case gas by using the pressure difference between the supercharging pressure Psc that occurs downstream of the compressor 38 and the atmospheric pressure that occurs upstream of the compressor 38. With the configuration according to this embodiment, the ventilation amount of the in-case gas is the sum (total ventilation amount Ventsum=Ventpcv+Venteje) of the ventilation amount Ventpcv by the PCV valve 28 and a ventilation amount Venteje by the ejector 80.

[Characteristics of Second Embodiment]

In the first embodiment described above, among the conditions under which the PCV valve 28 provides the ventilation amount Ventpcv that meets the required ventilation amount V, the condition under which the fuel consumption Fuelpcv is minimized is designated as the optimal ventilation condition. To the contrary, according to this embodiment, the condition under which the total ventilation amount Ventsum that meets the required ventilation amount V occurs with the minimum fuel consumption is designated as the optimal ventilation condition. In the following, details of a process that is performed by the ECU 70 to control the internal combustion engine 10 under such an optimal ventilation condition according to this embodiment will be described with reference to FIGS. 20 to 34.

(Flowchart according to Second Embodiment)

Figure 20:
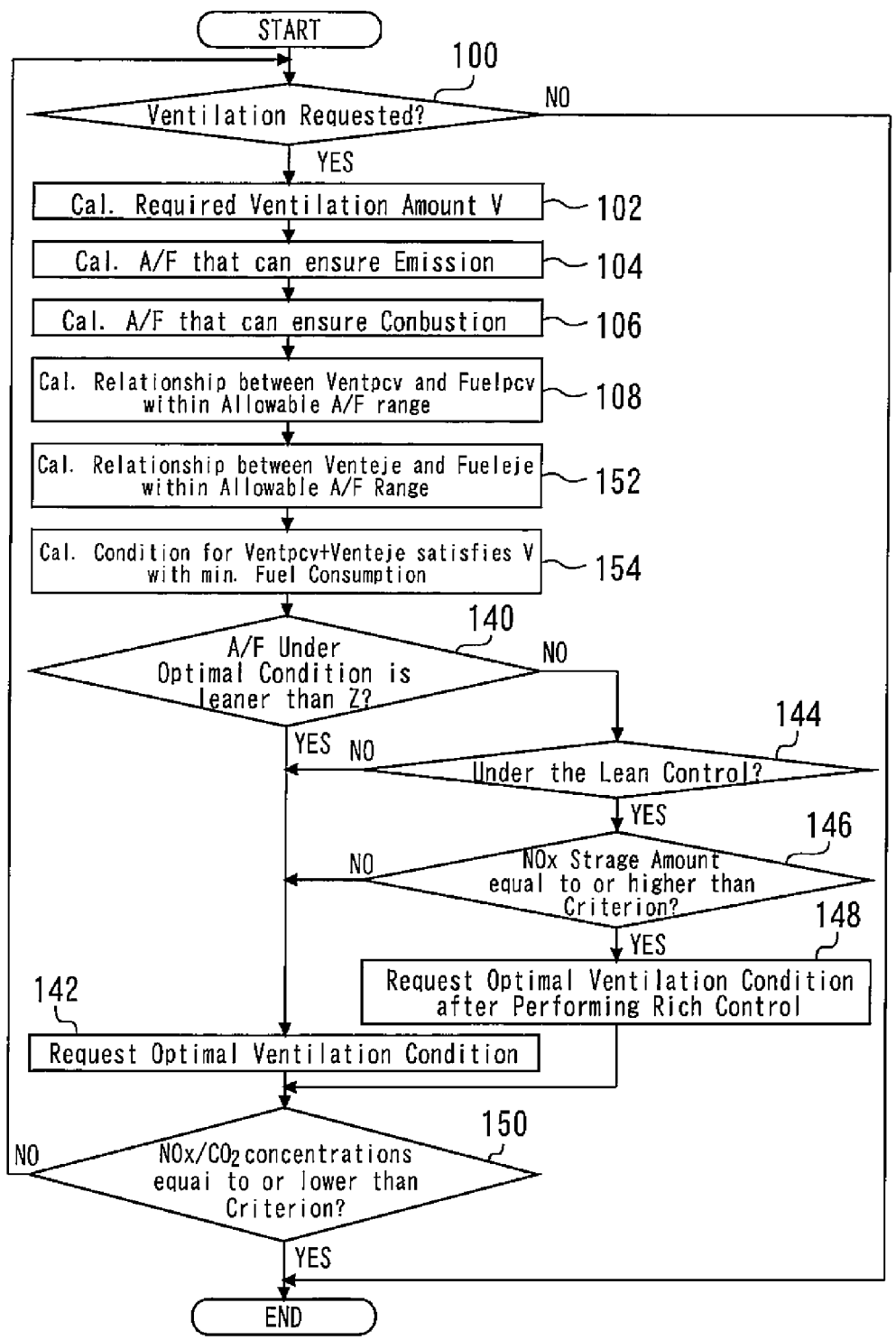
FIG. 20 is a flowchart showing a main routine performed in the second embodiment of the present invention.

FIG. 20 is a flowchart showing a main routine performed by the ECU 70 according to this embodiment. The ECU 70 performs the routine shown in FIG. 20 at a predetermined interval after the internal combustion engine 10 starts running. The routine shown in FIG. 20 is basically the same as the routine shown in FIG. 6 except that Step 110 is replaced with Steps 152 and 154. In the following, the steps shown in FIG. 20 that are the same as those shown in FIG. 6 will be denoted by the same reference numerals, and descriptions thereof will be omitted or simplified.

In the routine shown in FIG. 20, after the relationship between the ventilation amount Ventpcv by the PCV valve 28 and the fuel consumption Fuelpcv is calculated in Step 108, the same processing is performed for the ejector 80. More specifically, a relationship that holds between the ventilation amount Venteje by the ejector 80 and the fuel consumption Fueleje resulting from the ventilation due to the ejector is calculated within the allowable air-fuel ratio range (Step 152).

Based on the relationship calculated in Step 108 and the relationship calculated in Step 152, the optimal ventilation condition is calculated (Step 154). Among the conditions under which the total ventilation amount Ventsum meets the required ventilation amount V, the optimal ventilation condition in this embodiment is a condition under which the sum (referred to as a "total fuel consumption Fuelsum", hereinafter) of the fuel consumption Fuelpcv due to ventilation by the PCV valve 28 and the fuel consumption Fueleje due to ventilation by the ejector 80 is minimized.

Following Step 154, the processings of Step 140 to 150 are performed as in the first embodiment.

Figure 21:
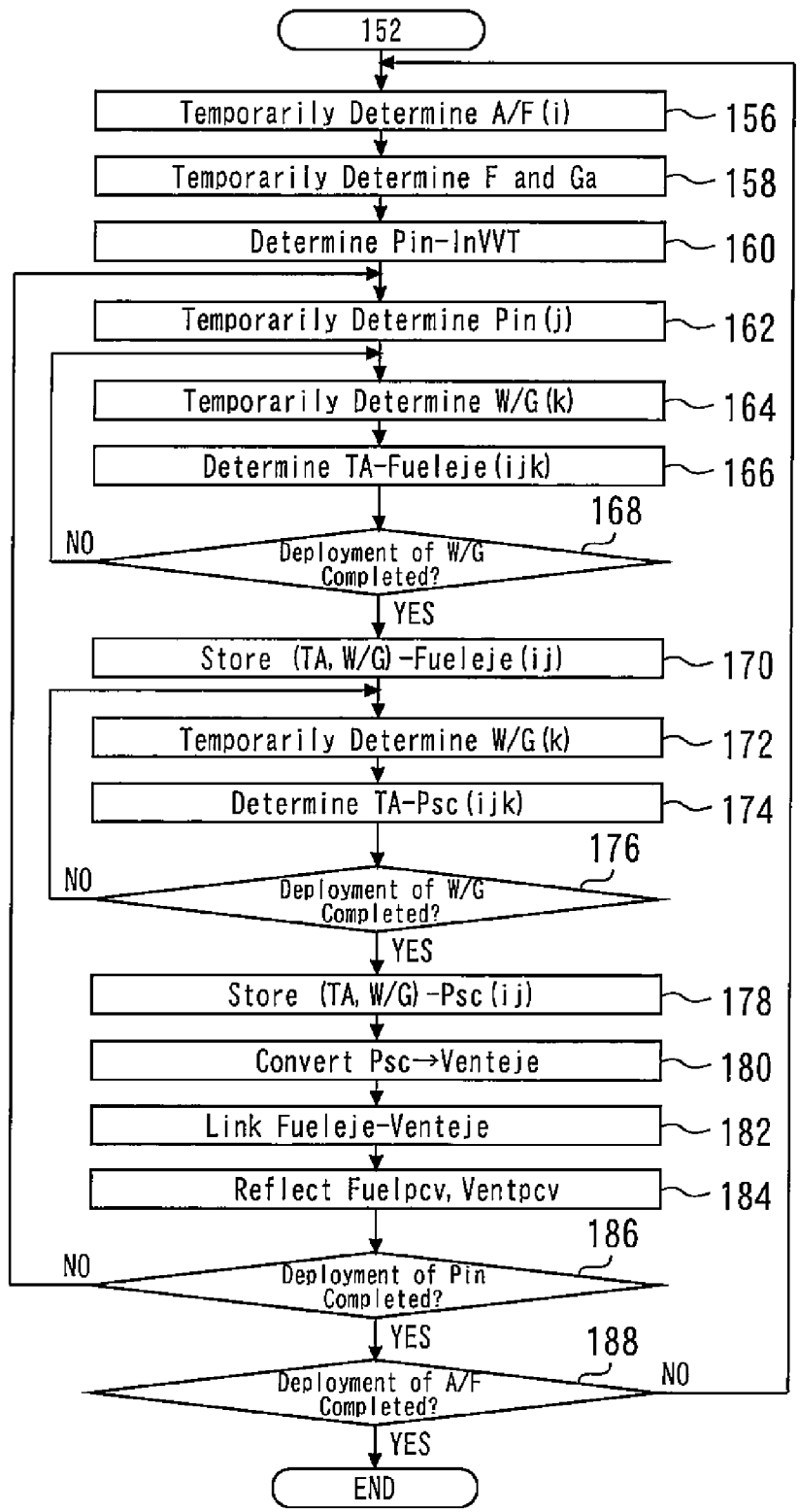
FIG. 21 is a flowchart for illustrating details of a process performed in Step 152 shown in FIG. 20.

FIG. 21 is a flowchart for illustrating details of a process performed in Step 152. As shown in FIG. 21, in Step 152, first, the air-fuel ratio A/F(i) is temporarily determined within the allowable air-fuel ratio range (Step 156).

The fuel injection amount F and the intake air amount Ga are then temporarily determined (Step 158). The processing of Step 158 is performed in the same manner as in Step 114 shown in FIG. 8. More specifically, based on the relationship shown in FIG. 9, the injection amount F that maintains a constant engine torque TRQ at the temporarily determined air-fuel ratio A/F(i) is temporarily determined. Furthermore, the intake air amount Ga that achieves the air-fuel ratio A/F(i) with the injection amount F is temporarily determined.

Next, the Pin-InVVT relationship is determined (Step 160). The processing of Step 160 is performed in the same manner as in Step 116 shown in FIG. 8. More specifically, among a plurality of characteristics shown in FIG. 11, a characteristic that corresponds to the temporarily determined Ga is designated as the Pin-InVVT relationship. It should be noted that the characteristics determined for each Ga in FIG. 11 are determined within a practical range of the intake manifold pressure Pin and a movable range of the intake valve characteristics InVVT.

The intake manifold pressure Pin is then temporarily determined (Step 162). As described above, the Pin-InVVT relationship is determined for the practical range of Pin. In Step 162, Pin is temporarily determined to be an arbitrary value within the practical range. In the following, the Pin temporarily determined will be denoted as "Pin(j)". Since the Pin-InVVT relationship is already determined when Step 162 is performed, InVVT is temporarily determined if Pin(j) is temporarily determined.

As described above, in the series of processings shown in FIG. 21, the air-fuel ratio A/F, the fuel injection amount F, the intake air amount Ga, the intake manifold pressure Pin and the intake valve characteristics InVVT are temporarily determined when Step 162 is performed. In the following, these parameters will be referred to as "combustion system parameters". In the internal combustion engine 10, if the combustion parameters are fixed, the remaining parameters are throttle opening angle TA and waste gate opening angle W/G. Both the two parameters are parameters having an effect on the fuel consumption of the internal combustion engine 10.

Figure 22:
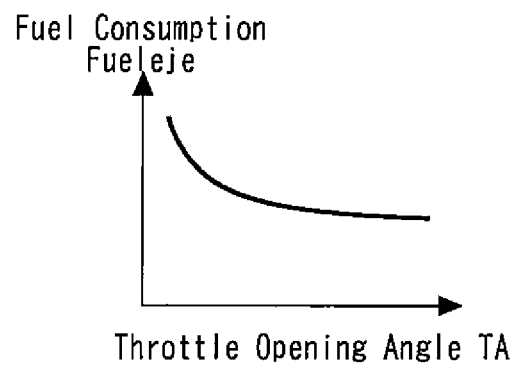
FIG. 22 shows a relationship that holds between a throttle opening and a fuel consumption.

FIG. 22 shows an example of a relationship that holds between the throttle opening angle TA and the fuel consumption of the internal combustion engine 10 under a situation in which the "combustion system parameters" are fixed. As described above, the ventilation amount Ventpcv by the PCV valve 28 is determined by the intake manifold pressure Pin. Since Pin is one of the combustion system parameters, the ventilation amount Ventpcv is independent of the throttle opening angle TA. Thus, the fuel consumption having a correlation with the throttle opening angle TA is related with only ventilation by the ejector 80. To clarify this point, the vertical axis in FIG. 22 is denoted as "fuel consumption Fueleje".

In the internal combustion engine 10, as the throttle opening angle TA increases, the pump loss decreases, and the load on the compressor 38 decreases. FIG. 22 shows how, under these influences, the fuel consumption increases as TA decreases, and the fuel consumption improves as TA increases.

Figure 23:
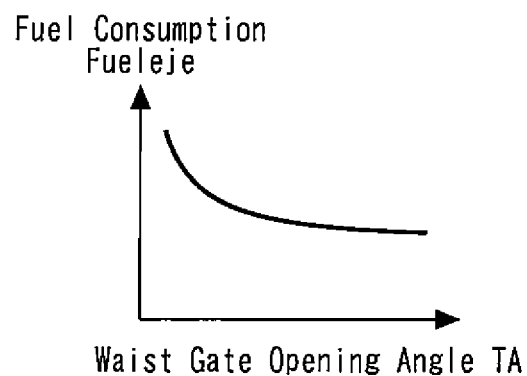
FIG. 23 shows a relationship that holds between a waste gate opening angle and a fuel consumption.

FIG. 23 shows an example of a relationship that holds between the waste gate opening angle W/G and the fuel consumption Fueleje under a situation in which the "combustion system parameters" are fixed. The vertical axis in FIG. 23 is also denoted as "fuel consumption Fueleje" for the same reason as with FIG. 22.

In the internal combustion engine 10, as the waste gate opening angle W/G increases, the exhaust gas more easily passes through the bypass channel 54, and the exhaust loss decreases. FIG. 23 shows how, under the influence of the exhaust loss, the fuel consumption increases as W/G decreases, and the fuel consumption improves as W/G increases.

As described above, the throttle opening angle TA and the waste gate opening angle W/G are correlated with the fuel consumption Fueleje due to ventilation by the ejector 80. If the waste gate opening angle W/G is fixed in addition to the "combustion system parameters" described above, the relationship between the throttle opening angle TA and the fuel consumption Fueleje can be determined as shown in FIG. 22. If the waste gate opening angle W/G is fixed, the ECU 70 according to this embodiment can calculate a TA-Fueleje relationship that holds at the W/G, based on the "combustion system parameters" described above.

In the series of processings shown in FIG. 21, following Step 162, the TA-Fueleje relationship is calculated. More specifically, first, the waste gate opening angle W/G is temporarily determined to be an arbitrary value W/G(k) within the practical range (Step 164).

Based on the temporarily determined combustion system parameters and W/G(k), the ECU 70 then calculates a relationship that holds between the throttle opening angle TA and the fuel consumption Fueleje (Step 166). This processing is performed in the state where the air-fuel ratio A/F is temporarily determined to be A/F(i), the intake manifold pressure Pin is temporarily determined to be Pin(j), and the waste gate opening angle W/G is temporarily determined to be W/G(k). To clarify this point, Fueleje in the frame of Step 166 is annotated with a symbol (ijk).

Once the processing described above ends, it is then determined whether deployment of W/G(k) is completed over the entire practical range or not (Step 168). If it is determined that the deployment of W/G(k) is not completed, the procedure from Step 164 is performed again for a different value of W/G(k).

If it is determined that the deployment of W/G(k) is completed, the relationship between (TA, W/G) and the fuel consumption Fueleje is stored (Step 170).

Figure 24:
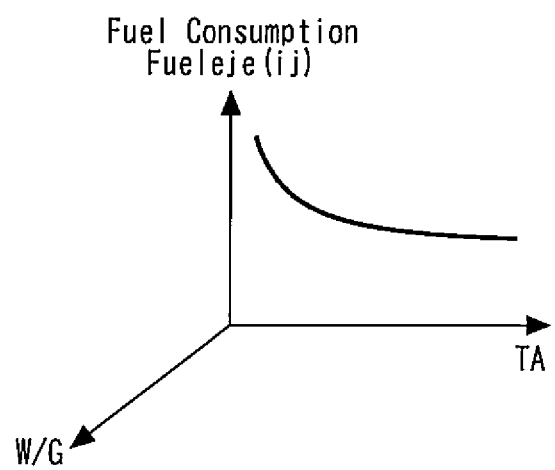
FIG. 24 schematically shows a relationship identified by the procedure performed in Step 170 shown in FIG. 21.

FIG. 24 schematically shows an example of the (TA, W/G)-Fueleje relationship stored in Step 170.

At the stage that Step 170 has been performed, deployment of W/G has been completed, and W/G is no longer temporarily determined to be W/G(k). Thus, in the frame of Step 170 and on the vertical axis in FIG. 24, a symbol (ij) is shown to show that A/F(i) and Pin(j) are temporarily determined.

In the internal combustion engine 10, the throttle opening angle TA and the waste gate opening angle W/G are factors that determine not only the fuel consumption Fueleje but also the supercharging pressure Psc.

Figure 25:
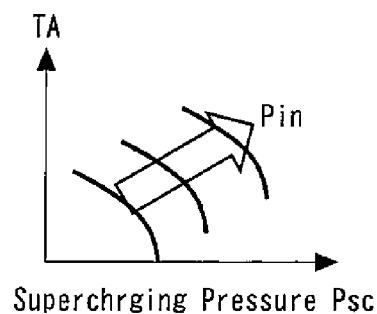
FIG. 25 a diagram showing a relationship between a supercharging pressure Psc and a throttle opening angle TA using an intake manifold pressure Pin as a parameter.

FIG. 25 shows a relationship that holds between the throttle opening angle TA and the supercharging pressure Psc. From the relationship shown in FIG. 25, the following phenomena can be read.

1. If the throttle opening angle TA is fixed, the higher the supercharging pressure Psc, the higher the intake manifold pressure Pin is.

2. If the supercharging pressure Psc is fixed, the greater the throttle opening angle TA is, the higher the intake manifold pressure Pin is.

3. To keep the intake manifold pressure Pin constant, the throttle opening angle TA needs to be reduced as the supercharging pressure Psc increases, and the supercharging pressure Psc needs to be reduced as the throttle opening angle TA increases.

The ECU 70 stores the relationship shown in FIG. 25 for the internal combustion engine 10. Therefore, under the situation where the intake manifold pressure Pin is temporarily determined, the ECU 70 can determine a TA-Psc relationship.

Figure 26:
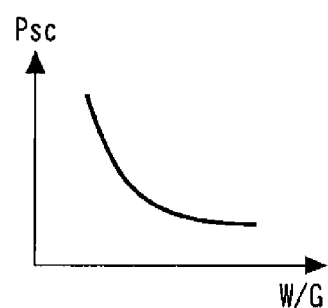
FIG. 26 shows a relationship that holds between supercharging pressure Psc and a waste gate opening angle.

FIG. 26 shows a relationship that holds between the waste gate opening angle W/G and the supercharging pressure Psc. From the relationship shown in FIG. 26, a phenomenon can be read in which, as the opening W/G becomes smaller, the efficiency of the turbocharger 36 increases, and the supercharging pressure Psc increases.

As described above, both the throttle opening angle TA and the waste gate opening angle W/G are correlated with the supercharging pressure Psc. In the internal combustion engine 10, if one of these values is fixed along with the "combustion system parameters" described above, the relationship between the other of these values and the supercharging pressure Psc can be uniquely determined. For example, if the waste gate opening angle W/G is fixed along with the "combustion system parameters", the relationship between the throttle opening angle TA and the supercharging pressure Psc can be determined to be one of the plurality of characteristics shown in FIG. 25. If the waste gate opening angle W/G is fixed, the ECU 70 according to this embodiment can calculate the TA-Psc relationship that holds at the WIG, based on the "combustion system parameters" described above.

In the series of processings shown in FIG. 21, following the processing of Step 170, calculation of the TA-Psc relationship is stated. More specifically, first, the waste gate opening angle W/G is temporarily determined to be an arbitrary value W/G(k) within the practical range (Step 172).

Based on the temporarily determined combustion system parameters and W/G(k), the ECU 70 then calculates a relationship that holds between the throttle opening angle TA and the supercharging pressure Psc (Step 174). This processing is performed in the state where the air-fuel ratio A/F is temporarily determined to be A/F(i), the intake manifold pressure Pin is temporarily determined to be Pin(j), and the waste gate opening angle W/G is temporarily determined to be W/G(k). To clarify this point, Psc in the frame of Step 174 is annotated with a symbol (ijk).

Once the processing described above ends, it is then determined whether deployment of W/G(k) is completed over the entire practical range or not (Step 176). If it is determined that the deployment of W/G(k) is not completed, the procedure from Step 172 is performed again for a different value of W/G(k).

If it is determined that the deployment of W/G(k) is completed, the relationship between (TA, W/G) and the supercharging pressure Psc is stored (Step 178).

Figure 27:
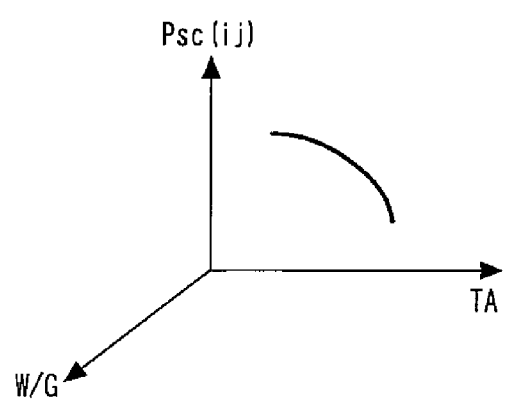
FIG. 27 schematically shows a relationship identified by the procedure performed in Step 178 shown in FIG. 21.

FIG. 27 schematically shows an example of the (TA, W/G)-Psc relationship stored in Step 178. At the stage of Step 178 has been performed, deployment of W/G has been completed, and W/G is no longer temporarily determined to be W/G(k). Thus, in the frame of Step 178 and on the vertical axis in FIG. 27, a symbol (ij) is shown to show that A/F(i) and Pin(j) are temporarily determined.

Once the processing described above ends, a processing of converting the supercharging pressure Psc into the ventilation amount Venteje by the ejector 80 is performed (Step 180).

Figure 28:
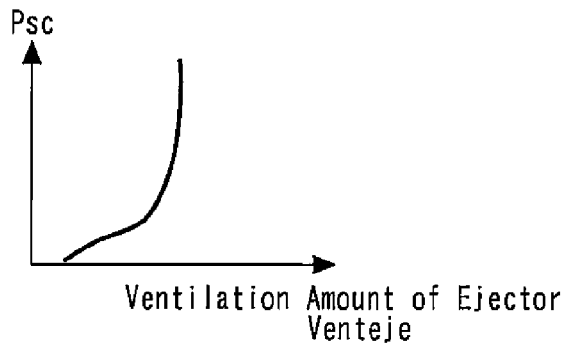
FIG. 28 shows a relationship that holds between supercharging pressure Psc and an ejector ventilation amount Venteje.

FIG. 28 shows a relationship that holds between the ventilation amount Venteje by the ejector and the supercharging pressure Psc. As described above, the ejector 80 of the internal combustion engine 10 ventilates the in-case gas by using the pressure difference between the upstream side and the downstream side of the compressor 38, that is, between the atmospheric pressure and the supercharging pressure Psc. Therefore, the ventilation amount Venteje is a value that corresponds to the supercharging pressure Psc as shown in FIG. 28. The ECU 70 stores the relationship shown in FIG. 28. In Step 180, based on the relationship, the (TA, W/G)-Psc(ij) relationship stored in Step 178 described above is converted into a (TA, W/G)-Venteje(ij) relationship.

The fuel consumption Fueleje and the ventilation amount Venteje for the ejector 80 is then linked (Step 182).

Figure 29:
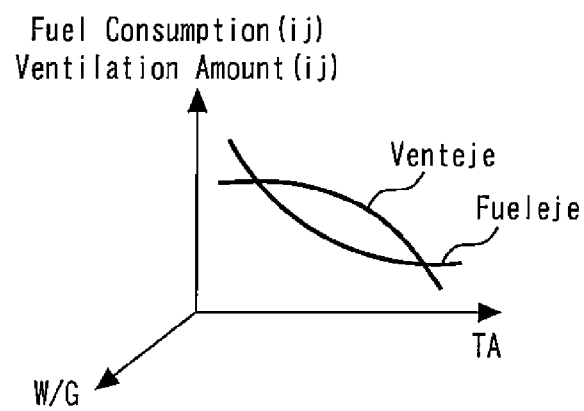
FIG. 29 schematically shows a relationship identified by the procedure performed in Step 182 shown in FIG. 21.

FIG. 29 schematically shows an example of the result of the processing of Step 182. Both the (TA, W/G)-Fueleje(ij) relationship stored in Step 170 and the (TA, W/G)-Venteje (ij) relationship obtained by the conversion in Step 182 have two axes of TA and W/G. Therefore, the fuel consumption Fueleje and the ventilation amount Venteje can be linked with each other via the two axes (TA and W/G) as shown in FIG. 29.

Once the processing described above ends, a processing of reflecting the fuel consumption Fuelpcv and the ventilation amount Ventpcv for the PCV valve 28 in the relationship shown in FIG. 29 is performed (Step 184). As described above, the relationship shown in FIG. 29 is determined in the state where the air-fuel ratio is temporarily determined to be A/F(i) and the intake manifold pressure is temporarily determined to be Pin(j). From the relationship shown in FIG. 15, the ECU 70 can read the fuel consumption Fuelpcv(ij) and the ventilation Ventpcv(ij) that occur under the combination of A/F(i) and Pin(j). In Step 184, specifically, the fuel consumption Fuelpcv(ij) and the ventilation amount Ventpcv(ij) read in this way are added to the fuel consumption Fueleje and the ventilation amount Venteje shown in FIG. 29, respectively.

Figure 30:
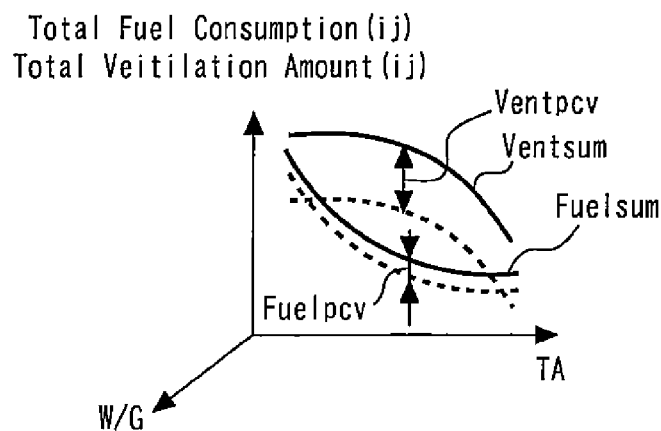
FIG. 30 schematically shows a relationship identified by the procedure performed in Step 184 shown in FIG. 21.

FIG. 30 shows an example of the relationship generated by the processing of Step 184. As shown in FIG. 30, by the processing described above, the total fuel consumption Fuelsum and the total ventilation amount Ventsum can be linked with each other under the temporarily determined A/F(i) and Pin(j) by using (TA, W/G) as a parameter.

Once the processing described above ends, it is then determined whether deployment of Pin(j) is completed over the entire practical range or not (Step 186). If it is determined that the deployment of Pin(j) is not completed, the procedure from Step 162 is performed again for a different value of Pin(j). If it is determined that the deployment of Pin(j) is completed, it can be determined that collection of required data is completed over the entire range of the intake manifold pressure pin.

Figure 31:
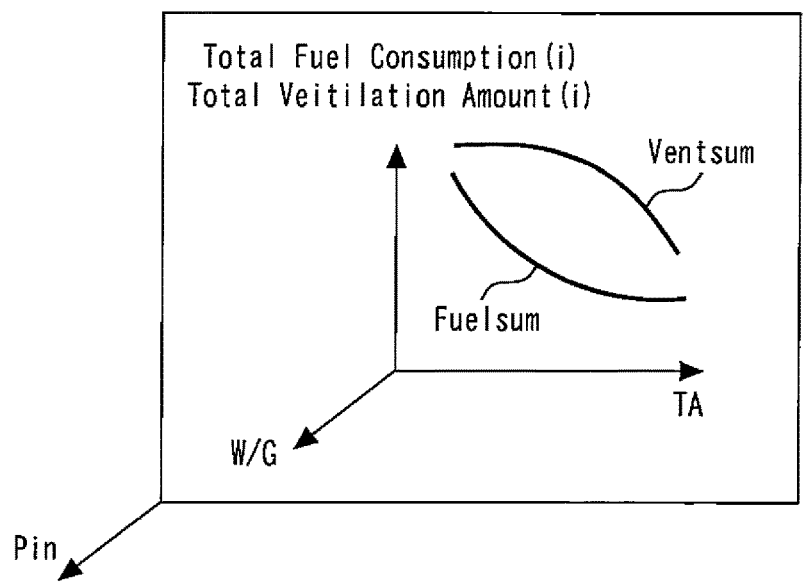
FIG. 31 schematically shows a relationship identified by the procedure performed in Step 186 shown in FIG. 21.

FIG. 31 schematically shows an example of the relationship between the total fuel consumption Fuelsum and the total ventilation amount Ventsum stored in the ECU 70 when Step 186 is ended. At this stage, the deployment of the intake manifold pressure Pin has been completed, and Pin is no longer temporarily determined to be Pin(j). Thus, on the vertical axis in FIG. 31, a symbol (i) is shown to clarify that A/F is temporarily determined to be A/F(i). In the following, the symbols (i), (ij) and (ijk) will be used on the same rule as described above, and descriptions thereof will be omitted.

In the series of processings shown in FIG. 21, it is then determined whether deployment of A/F(i) is completed over the allowable air-fuel ratio range or not (Step 188). If it is determined that the deployment of A/F(i) is not completed, the procedure from Step 156 is performed again for a different value of A/F(i). If it is determined that the deployment of A/F(i) is completed, the series of processings shown in FIG. 21 ends.

Figure 32:
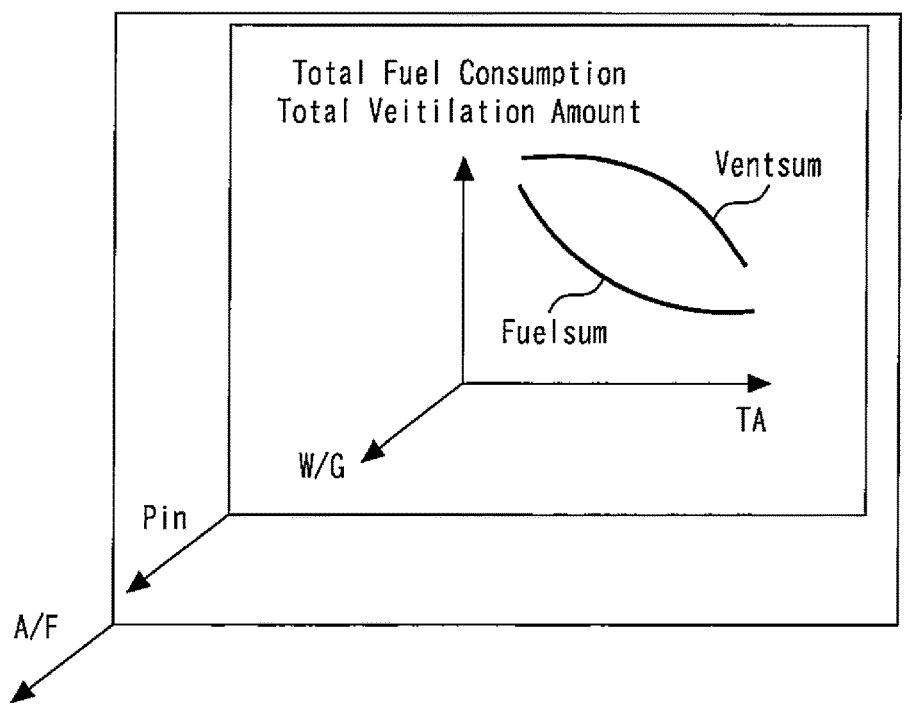
FIG. 32 schematically shows a relationship identified by the procedure performed in Step 188 shown in FIG. 21.

FIG. 32 schematically shows an example of the relationship between the total fuel consumption Fuelsum and the total ventilation amount Ventsum stored in the ECU 70 at the stage when the series of processings shown in FIG. 21 is ended. As shown in FIG. 32, by the processing described above, the total fuel consumption Fuelsum and the total ventilation amount Ventsum provided by both the PCV valve 28 and the ejector 80 can be appropriately determined by using A/F, Pin, W/G and TA as parameters.

Figure 33:
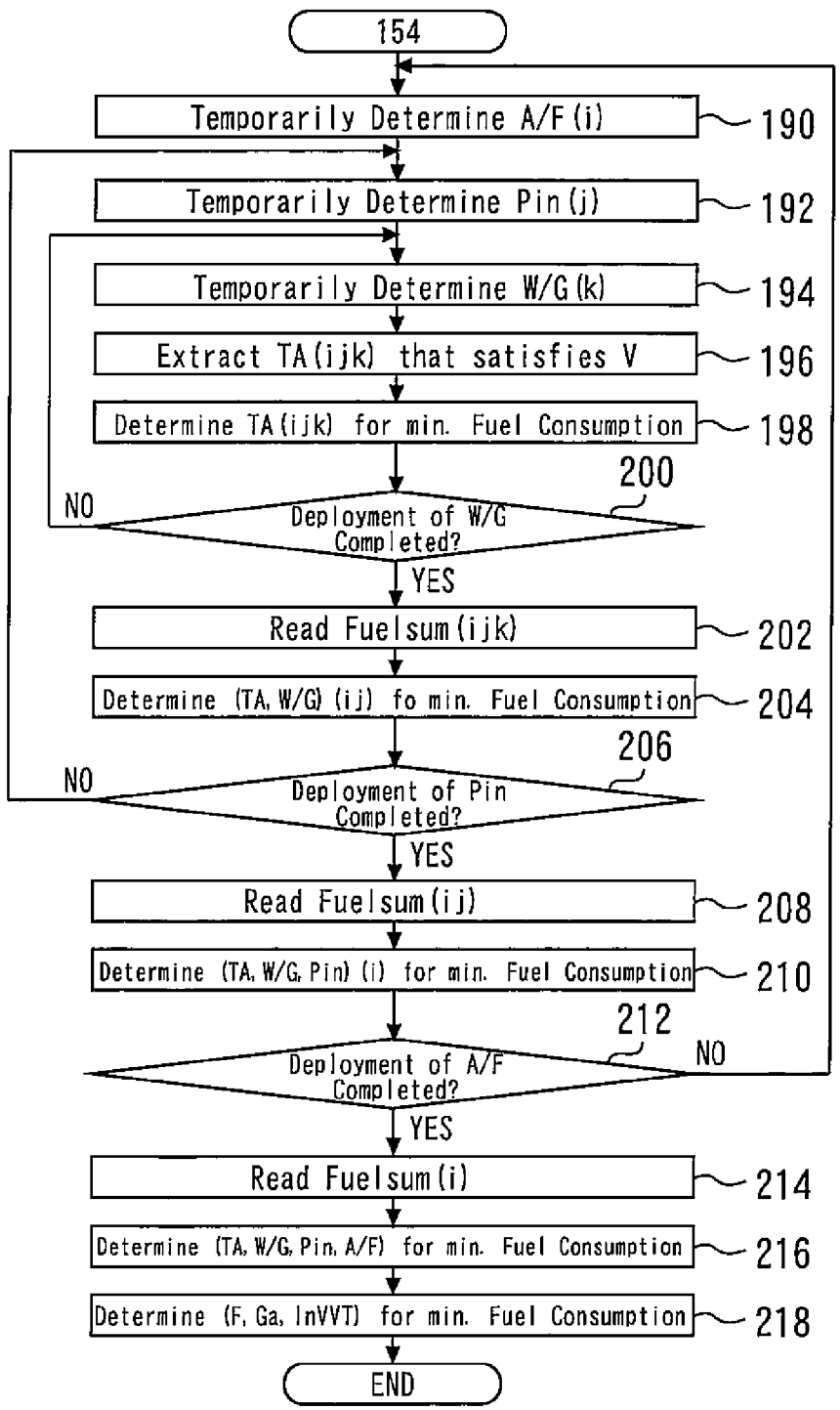
FIG. 33 is a flowchart illustrating details of the procedure performed in Step 154 shown in FIG. 20.

FIG. 33 is a flowchart for illustrating details of a process performed in Step 154 in the main routine shown in FIG. 20. The series of processings shown in FIG. 33 is performed based on the relationship shown in FIG. 32 described above to calculate an operational state in which the total ventilation amount Ventsum that meets the required ventilation amount V is achieved with the minimum total fuel consumption Fuelsum.

In the series of processings shown in FIG. 33, first, the air-fuel ratio A/F(i) is temporarily determined (Step 190). The processing of Step 190 is performed for the information shown in FIG. 32. The information shown in FIG. 32 is obtained by deploying the relationship between the total fuel consumption Fuelsum(i) and the total ventilation amount Ventsum(i) shown in FIG. 31 over the entire allowable air-fuel ratio range. Thus, once the A/F(i) is temporarily determined for the information shown in FIG. 32, a relationship similar to that shown in FIG. 31 is determined.

After that, the intake manifold pressure Pin(j) is temporarily determined (Step 192), and the waste gate opening angle W/G(k) is then temporarily determined (Step 194). These processings are also performed for the information shown in FIG. 32. By the processing of Step 192, a relationship similar to that shown in FIG. 30 is determined. By the processing of Step 194, a relationship similar to the relationship shown in FIG. 30 without the W/G axis is determined.

Once the processing described above ends, based on the determined relationship between the total fuel consumption Fuelsum and the total ventilation amount Ventsum, TA(ijk) that provides the total ventilation amount Ventsum that meets the required ventilation amount V is extracted (Step 196).

Figure 34:
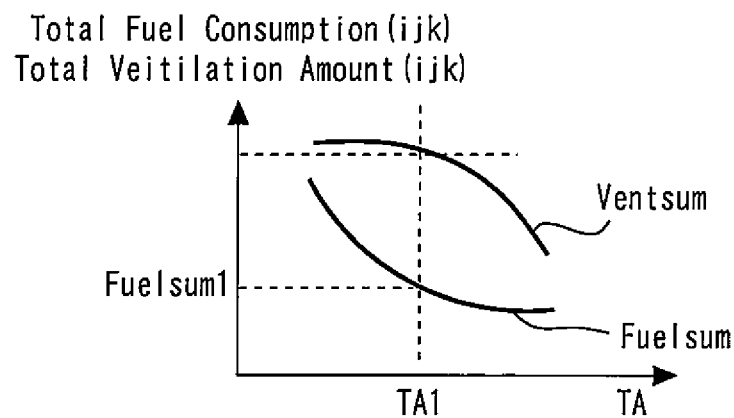
FIG. 34 is a diagram for explaining the procedure performed in Step 194 shown in FIG. 33.

FIG. 34 is a diagram showing the relationship determined in Step 194 and the required ventilation amount V. In the example shown in FIG. 34, the total ventilation amount Ventsum meets the required ventilation amount V when the throttle opening angle TA meets a relationship TA≤TA1. Thus, in this case, TA equal to or smaller than TA1 is extracted as TA(ijk) that meets the required ventilation amount V.

Within the TA(ijk) extracted in the above processing, TA(ijk) that provides the minimum total fuel consumption Fuelsum is determined (Step 198). In the example shown in FIG. 34, TA1 provides the minimum total fuel consumption Fuelsum. Therefore, in this case, TA1 is determined as TA(ijk) that provides the minimum fuel consumption.

Once the processing described above ends, it is then determined whether deployment of W/G(k) is completed over the entire practical range or not (Step 200). If the deployment of W/G(k) is not completed, the procedure from Step 194 is performed again for a different W/G(k). If it is determined that the deployment is completed, it can be determined that all TA(ijk)s each of which provides the minimum fuel consumption have been extracted from the entire practical range.

In the series of processings shown in FIG. 33, the total fuel consumption Fuelsum(ijk)s achieved by the TA(ijk)s each of which provides the minimum fuel consumption are read (Step 202). In the example shown in FIG. 34, TA(ijk) that provides the minimum total fuel consumption is TA1. The total fuel consumption Fuelsum(ijk) achieved by the minimum fuel consumption TA(ijk) is Fuelsum1. Therefore, in this case, Fuelsum1 is read as Fuelsum(ijk). The processing of Step 202 is performed for all TA(ijk)s extracted in Step 198.

Figure 35:
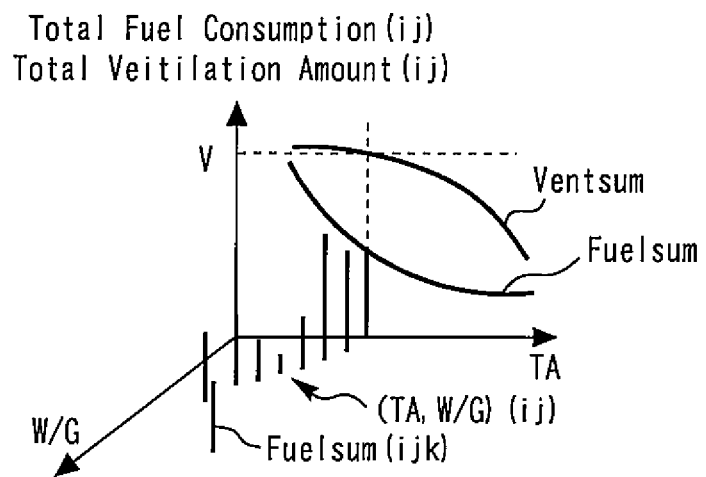
FIG. 35 is a diagram for explaining the procedure performed in Step 202 shown in FIG. 33.

FIG. 35 is a bar graph that shows a plurality of values of Fuelsum(ijk) in a two-dimensional coordinate system of W/G and TA. By the processing of Step 202, the heights of all the bars shown in FIG. 35 are read from the entire practical range of W/G.

Of all the read values of the total fuel consumption Fuelsum(ijk)s, the minimum value is determined. A combination of W/G and TA that achieves the minimum value of Fuelsum(ijk) is determined (Step 204). By this processing, under the temporarily determined A/F(i) and Pin(j), the combination (W/G, TA)(ij) that provides the total ventilation amount Ventsum(ij) that meets the required ventilation amount with the minimum total fuel consumption Fuelsum (ij) can be determined.

Once the processing described above ends, it is determined whether deployment of Pin(j) is completed over the entire practical range or not (Step 206). If the deployment of Pin(j) is not completed, the procedure from Step 192 is performed again for a different Pin(j). If it is determined that the deployment is completed, it can be determined that all the combination (W/G, TA)(ij)s each of which provides the minimum fuel consumption have been extracted from the entire practical range of Pin.

In the series of processings shown in FIG. 33, the total fuel consumption Fuelsum(ij) achieved by the combination (W/G, TA)(ij) that provides the minimum fuel consumption is read (Step 208). This processing is performed for all the combinations (TA, W/G)(ij) extracted in Step 204. Of all the read values of the total fuel consumption Fuelsum(ij), the minimum value is determined. And the combination (W/G, TA, Pin) that provides the minimum Fuelsum(ij) is determined (Step 210). These processings are performed in the same manner as the processings of Steps 202 and 204 described above. By these processings, under the temporarily determined A/F(i), the combination (W/G, TA, Pin)(i) that provides the total ventilation amount Ventsum(i) that meets the required ventilation amount V and provides the minimum total fuel consumption Fuelsum(i) can be determined.

It is then determined whether deployment of A/F(i) is completed over the entire allowable air-fuel ratio range or not (Step 212). If the deployment of A/F(i) is not completed, the procedure from Step 190 is performed again for a different A/F(i). If it is determined that the deployment of A/F(i) is completed, it can be determined that all the combinations (W/G, TA, Pin) each of which provides the minimum fuel consumption have been extracted from the entire allowable air-fuel ratio range.

Once the processing described above ends, the total fuel consumption Fuelsum(i) achieved by the combination (W/G, TA, Pin)(i) that provides the minimum fuel consumption is read (Step 214). This processing is performed for all the combinations (TA, W/G, Pin)(i) extracted in Step 210. Of all the read values of the total fuel consumption Fuelsum (i), the minimum value is then determined. And the combination (W/G, TA, Pin, A/F) that provides the minimum Fuelsum(i) is determined (Step 216). These processings are performed in the same manner as the processings of Steps 202 and 204 described above. By these processings, among all the possible combinations (W/G, TA, Pin, A/F), the combination (W/G, TA, Pin, A/F) that provides the total ventilation amount Ventsum that meets the required ventilation amount V and provides the minimum total fuel consumption Fuelsum can be determined.

Following the processing described above, the optimal ventilation condition for meeting the required ventilation amount V with the minimum fuel consumption is determined. That is, the other parameters (F, Ga, InVVT) that are to be used with the combination (W/G, TA, Pin, A/F) determined in Step 216 are determined (Step 218). The specific processing performed in Step 218 is the same as the processing of Step 138 shown in FIG. 16.

By the process described above, an operational condition of the internal combustion engine 10 under which the PCV valve 28 and the ejector 80 provide the total ventilation amount Ventsum that meets the required ventilation amount V with the minimum fuel consumption can be determined. The air-fuel ratio A/F and the fuel injection amount F determined are values that maintain good exhaust characteristics and drivability, as in the first embodiment. Thus, according to this embodiment, as in the first embodiment, ventilation of the crankcase 24 can be appropriately promoted without deteriorating the exhaust characteristics and the drivability.

Furthermore, according to this embodiment, ventilation of the crankcase 24 is achieved by using the PCV valve 28 and the ejector 80. The PCV valve 28 and the ejector 80 exert high ventilation capacity under different conditions. Consequently, according to this embodiment, high ventilation capability can be ensured over an even wider operation range than in the first embodiment.

[Examples of Modification of Second Embodiment]

In the second embodiment described above, the air-fuel ratio A/F(i) that provides the minimum fuel consumption is determined, and ventilation is promoted under the optimal ventilation condition. However, the present invention is not limited to this implementation. For example, the requirement of the minimum fuel consumption may be eliminated, and ventilation may be promoted under a ventilation condition that meets the required ventilation amount V. This modification can be made by performing the following processings in Step 154 shown in FIG. 20.

1. One combination of A/F, Pin, WIG and TA that meets the required ventilation amount V is determined.

2. For the combination, F, Ga and InVVT are determined in the same method as that according to the first embodiment.

3. The combination of various parameters determined in the processings 1 and 2 described above is set as a ventilation condition that is substituted for the optimal ventilation condition.

The invention claimed is:

1. An internal combustion engine, comprising:
an electronic control unit including a computer and processor for executing programs stored in memory of the computer, the electronic control unit configured to detect the state of the internal combustion engine based on outputs from a plurality of sensors located on the engine and control the state of the internal combustion engine based on the outputs;
a positive crankcase ventilation (PCV) valve that ventilates a crankcase by causing suction of an in-case gas into an intake passage;
a three-way catalyst and an NOx storage/reduction catalyst disposed in an exhaust passage; and
the electronic control unit drives an actuator of the internal combustion engine,
wherein the electronic control unit is programmed to:
perform a stoichiometric control for making the internal combustion engine run in a stoichiometric region including a theoretical air-fuel ratio and a lean control for making the internal combustion engine run in a lean region that is leaner than the stoichiometric region, and,
when it is determined by the electronic control unit that ventilation is necessary for the crankcase, the electronic control unit extracts as a ventilation condition, a combination of an air-fuel ratio of an air-fuel mixture, a fuel injection amount and an intake manifold pressure with which a ventilation amount of the in-case gas per unit time increases among combinations of those, and changes the air-fuel ratio, the fuel injection amount and the intake manifold pressure in accordance with the ventilation condition,
wherein the extraction concerning the air-fuel ratio is performed within an allowable air-fuel ratio range in which the three-way catalyst and the NOx storage/reduction catalyst are capable of purifying an exhaust gas and ensuring in-cylinder combustion of the air-fuel mixture, and
wherein the air-fuel ratio and the fuel injection amount extracted as the ventilation condition meets a relationship that maintains a constant engine torque before and after the change.

2. The internal combustion engine according to claim 1, wherein the electronic control unit sets a required ventilation amount of the in-case gas per unit time when it is determined by the electronic control unit that ventilation is necessary for the crankcase, and
the ventilation condition is extracted so that the ventilation amount meets the required ventilation amount.

3. The internal combustion engine according to claim 1, wherein, when it is determined by the electronic control unit that ventilation is necessary for the crankcase, the electronic control unit
(1-1) temporarily determines the air-fuel ratio within the allowable air-fuel ratio range,
(1-2) performs a determination processing for determining the intake manifold pressure that meets the required ventilation amount with the minimum fuel consumption for a combination of the temporarily determined air-fuel ratio and the fuel injection amount that maintains the constant engine torque at the air-fuel ratio,
(2) repeatedly performs the determination processing for each of a plurality of air-fuel ratios included in the allowable air-fuel ratio range, and
(3) extracts, as the ventilation condition, a combination of an intake manifold pressure that provides the minimum fuel consumption among all intake manifold pressures determined in the determination processing and the air-fuel ratio and fuel injection amount used in the determination processing of determining the intake manifold pressure.

4. The internal combustion engine according to claim 2, wherein the electronic control unit
detects an NOx concentration in the crankcase with at least one of the plurality of sensors, and
sets the required ventilation amount based on the NOx concentration.

5. The internal combustion engine according to claim 2, wherein the electronic control unit
detects a CO2 concentration in the crankcase with at least one of the plurality of sensors, and
sets the required ventilation amount based on the CO2 concentration.

6. The internal combustion engine according to claim 1, further comprising:
a throttle valve that controls an intake air amount;
a supercharger provided with a waste gate valve; and
an ejector that ventilates the crankcase by using a pressure difference between before and after a compressor of the supercharger,
wherein the ventilation condition is a combination with which a total ventilation amount per unit time achieved by both the PCV valve and the ejector increases, among combinations of the air-fuel ratio of the air-fuel mixture, the fuel injection amount, the intake manifold pressure, a throttle opening and a waste gate opening angle.

7. The internal combustion engine according to claim 6, wherein, when the ventilation request is issued, the electronic control unit sets a required ventilation amount of the in-case gas per unit time, and the ventilation condition is extracted so that the total ventilation amount meets the required ventilation amount.

8. The internal combustion engine according to claim 7, wherein the ventilation condition is a combination that meets the required ventilation amount with a minimum fuel consumption, among combinations of the air-fuel ratio within the allowable air-fuel ratio range, the fuel injection amount that maintains the constant engine torque, the intake manifold pressure, the throttle opening and the waste gate opening angle.

9. The internal combustion engine according to claim 8, wherein, when the ventilation request is issued, the electronic control unit
- (1-1) temporarily determines the air-fuel ratio within the allowable air-fuel ratio range,
- (1-2) temporarily determines the intake manifold pressure within a practical range,
- (1-3) performs a determination processing for determining a pair of the throttle opening and the waste gate opening angle that meets the required ventilation amount with the minimum fuel consumption for the combination of the temporarily determined intake manifold pressure and air-fuel ratio and the fuel injection amount that allows generation of the constant torque at the air-fuel ratio, and
- (2) repeatedly performs the determination processing for each of a plurality of combinations of a plurality of air-fuel ratios included in the allowable air-fuel ratio range and a plurality of intake manifold pressures included in the practical range.

10. The internal combustion engine according to claim 7, wherein the electronic control unit
detects an NOx concentration in the crankcase, and
sets the required ventilation amount based on the NOx concentration.

11. The internal combustion engine according to claim 7, wherein the electronic control unit
detects a CO2 concentration in the crankcase, and
sets the required ventilation amount based on the CO2 concentration.

12. The internal combustion engine according to claim 1, wherein the electronic control unit
detects an NOx concentration in the crankcase, and
determines that ventilation is necessary for the crankcase when the NOx concentration reaches a threshold.

13. The internal combustion engine according to claim 1, wherein the electronic control unit
detects a CO2 concentration in the crankcase, and
determines that ventilation is necessary for the crankcase when the CO2 concentration reaches a threshold.

14. The internal combustion engine according to claim 1, wherein the allowable air-fuel ratio range consists of said stoichiometric region and said lean region,
between said stoichiometric region and said lean region, there is an intermediate region in which NOx in the exhaust gas is not purified by the three-way catalyst and the NOx storage/reduction catalyst, and
when the electronic control unit changes the air-fuel ratio in response to the ventilation request being issued, if the air-fuel ratio changes across the intermediate region, the electronic control unit performs the change after performing a rich control to make the air-fuel ratio of the air-fuel mixture richer than the theoretical air-fuel ratio until the NOx storage/reduction catalyst restores a NOx storage capacity.

* * * * *